United States Patent [19]
Kanai et al.

[11] Patent Number: 5,832,523
[45] Date of Patent: Nov. 3, 1998

[54] ARCHIVING DEVICE AND DATA FILE SERVER USING DATA FILE RECORDED IN DIVISION OVER RECORDING MEDIA

[75] Inventors: Tatsunori Kanai, Kanagawa; Seiji Maeda, Tokyo; Toshiki Kizu; Hiroshi Yao, both of Kanagawa, all of Japan

[73] Assignee: Kabushiki Kaisha Toshiba, Kawasaki, Japan

[21] Appl. No.: 706,334

[22] Filed: Aug. 30, 1996

[30] Foreign Application Priority Data

Aug. 30, 1995 [JP] Japan ..................................... 7-222157
Jun. 24, 1996 [JP] Japan ..................................... 8-162754

[51] Int. Cl.$^6$ ...................................................... G06F 17/30
[52] U.S. Cl. ........................................... 707/204; 395/441
[58] Field of Search ..................................... 395/601, 611, 395/616, 617, 618, 619, 620, 621, 622, 326, 329, 441, 182.01, 182.04, 182.13; 707/1, 50, 100, 5, 104, 200, 206

[56] References Cited

U.S. PATENT DOCUMENTS

| | | | |
|---|---|---|---|
| 4,755,928 | 7/1988 | Johnson et al. | 395/182.04 |
| 5,515,502 | 5/1996 | Wood | 395/182.13 |
| 5,584,008 | 12/1996 | Shimada et al. | 395/441 |
| 5,659,746 | 8/1997 | Bankert et al. | 395/621 |
| 5,671,350 | 9/1997 | Wood | 395/182.13 |

OTHER PUBLICATIONS

Chervenak, "Tertiary Storage: An Evaluation of New Applications", pp. 1–175, 1994.

*Primary Examiner*—Thomas G. Black
*Assistant Examiner*—Ruay Lian Ho
*Attorney, Agent, or Firm*—Foley & Lardner

[57] ABSTRACT

An archiving device with a plurality of drive devices for reading out a plurality of data constituting one data file from a plurality of removable recording media in parallel. A recording media loading/unloading device selectively loads/unloads the removable recording media to/from the drive devices. A control device controls the media loading/unloading operations by the recording media loading/unloading device and data reading operations by the drive devices according to a reading request for a desired data file so as to selectively use the drive devices in reading the desired data file from the removable recording media.

19 Claims, 22 Drawing Sheets

FIG.4A

DATA FILE A

| a1 | a2 | a3 | a4 | a5 | a6 | a7 | a8 | a9 | a10 | a11 | a12 | a13 | a14 | a15 | a16 |

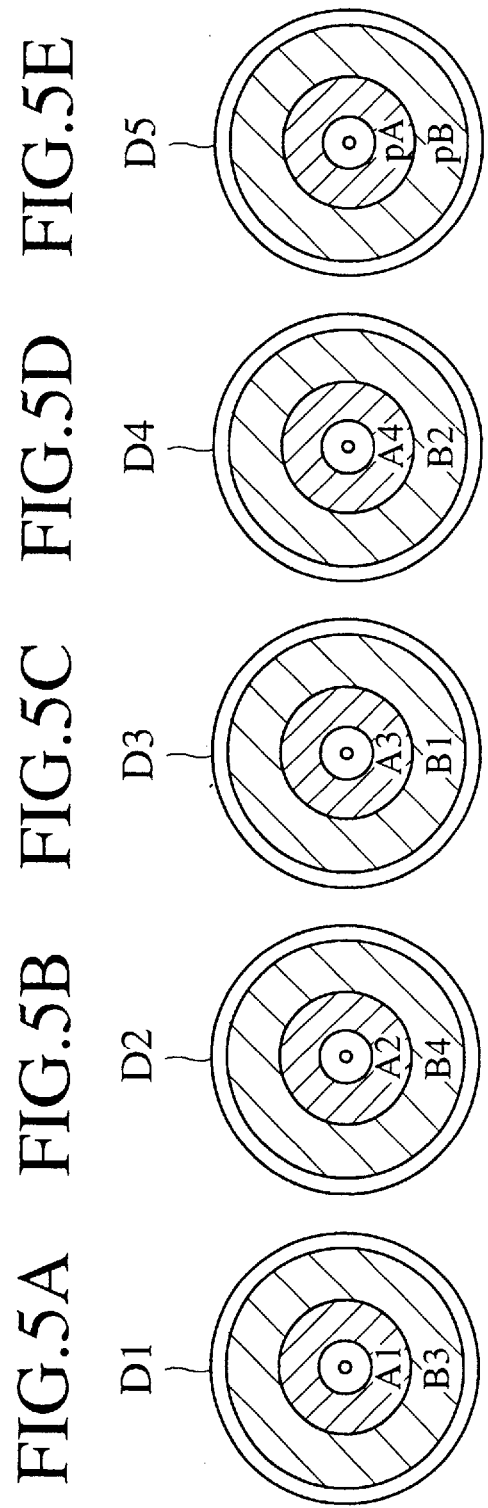

FIG.7

| CONTENTS TITLE | DISK D1 | | | DISK D2 | | | DISK D3 | | | DISK D4 | | | DISK D5 | | |
|---|---|---|---|---|---|---|---|---|---|---|---|---|---|---|---|
| | DISK NO. | START BLOCK | LENGTH | DISK NO. | START BLOCK | LENGTH | DISK NO. | START BLOCK | LENGTH | DISK NO. | START BLOCK | LENGTH | DISK NO. | START BLOCK | LENGTH |
| MOVIE A | 10 | 100 | 50 | 11 | 100 | 50 | 12 | 100 | 50 | 13 | 100 | 50 | 14 | 100 | 50 |
| MOVIE B | 25 | 200 | 50 | 26 | 200 | 50 | 27 | 200 | 50 | 28 | 200 | 50 | 29 | 200 | 50 |
| MOVIE C | 10 | 0 | 100 | 11 | 0 | 100 | 12 | 0 | 100 | 13 | 0 | 100 | 14 | 0 | 100 |
| MOVIE D | 45 | 0 | 150 | 46 | 0 | 150 | 47 | 0 | 150 | 48 | 0 | 150 | 49 | 0 | 150 |
| MOVIE E | 30 | 0 | 50 | 31 | 0 | 50 | 32 | 0 | 50 | 33 | 0 | 50 | 34 | 0 | 50 |
| ... | | | | | | | | | | | | | | | |

FIG.8

| CONTENTS TITLE | PRIORITY LEVEL | DISK D1 | DISK D2 | DISK D3 | DISK D4 | DISK D5 |
|---|---|---|---|---|---|---|
| MOVIE B | 1 | 220 | 220 | -1 | 220 | 220 |
| MOVIE D | 2 | 50 | 50 | 50 | 50 | -1 |
| MOVIE E | 3 | 10 | 10 | 0 | 0 | -1 |
| MOVIE A | 2 | 130 | 130 | 100 | 100 | -1 |
| ⋮ | | | | | | |

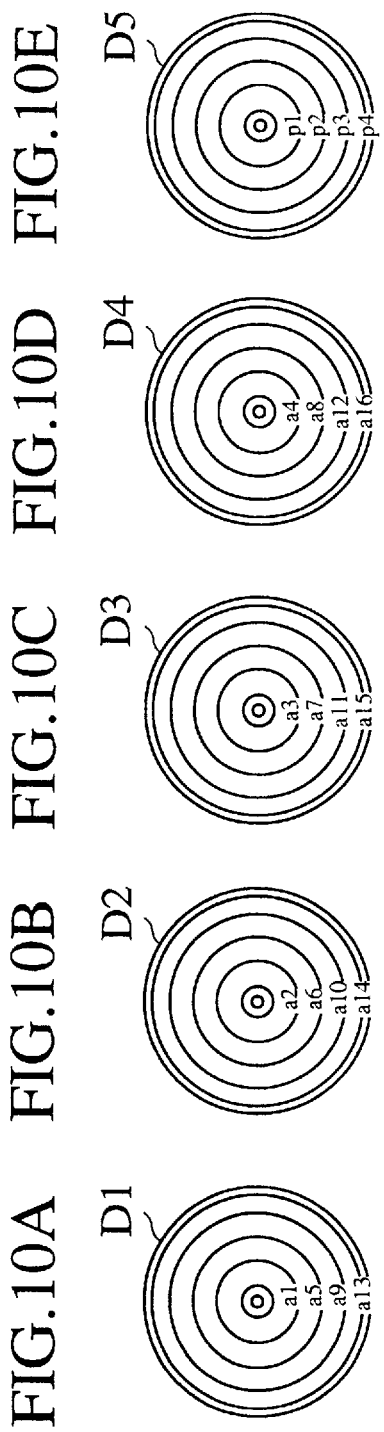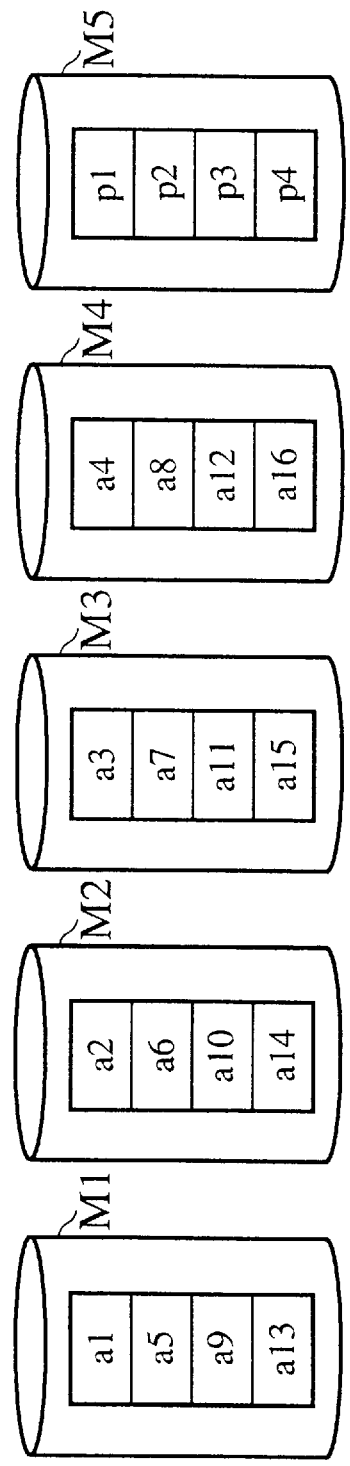

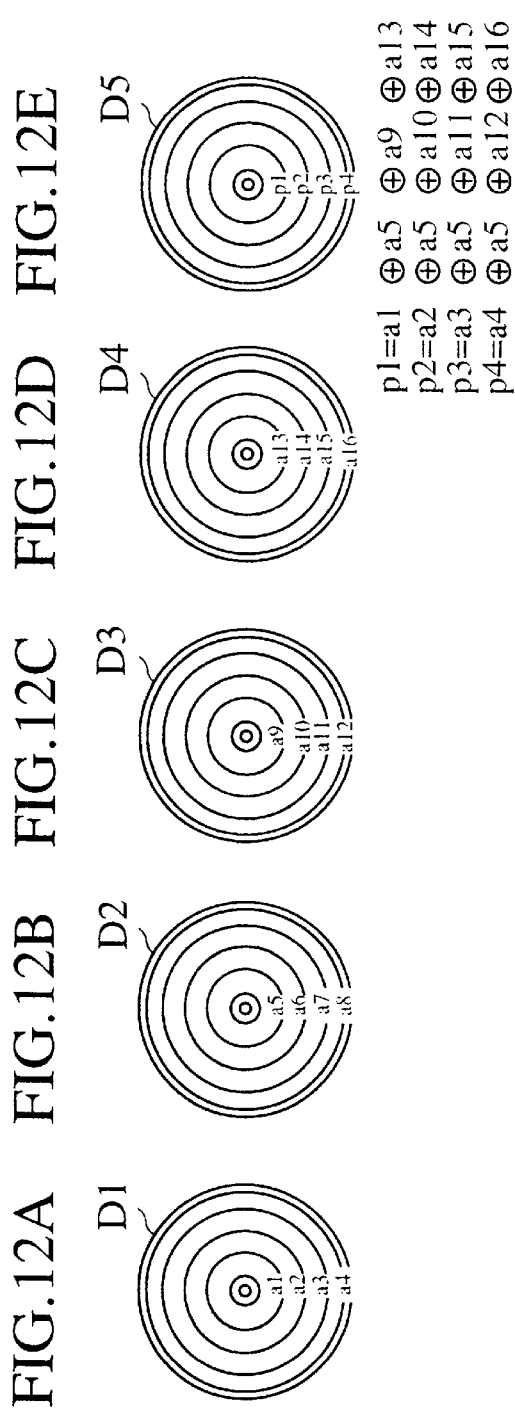
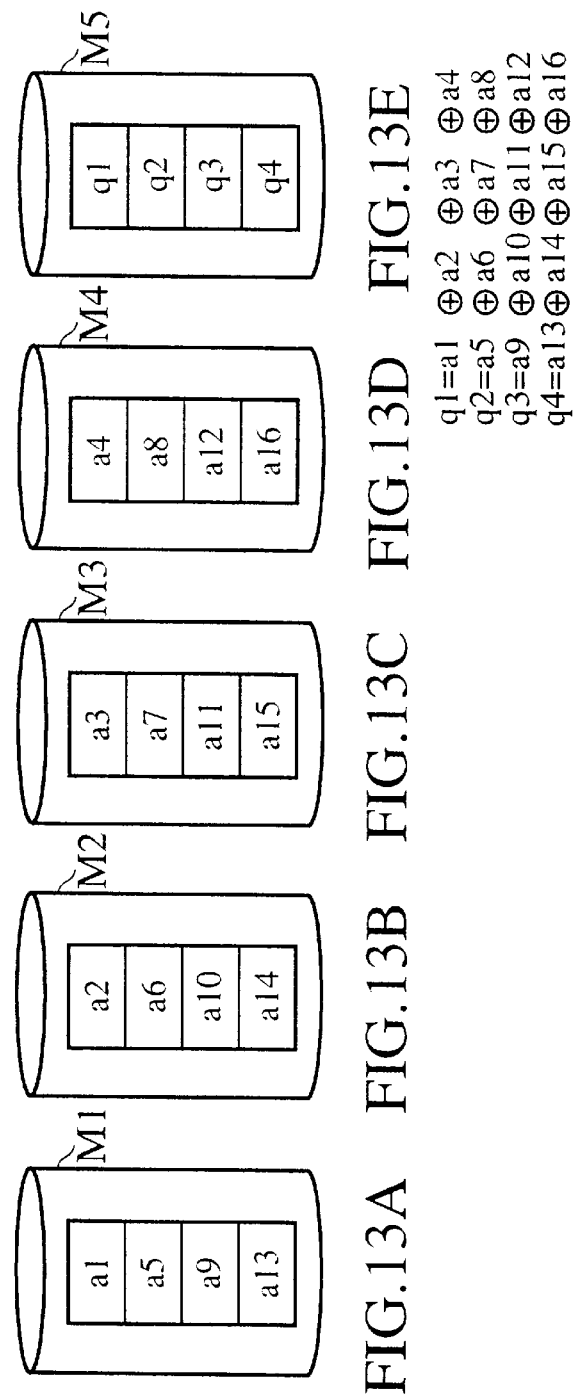

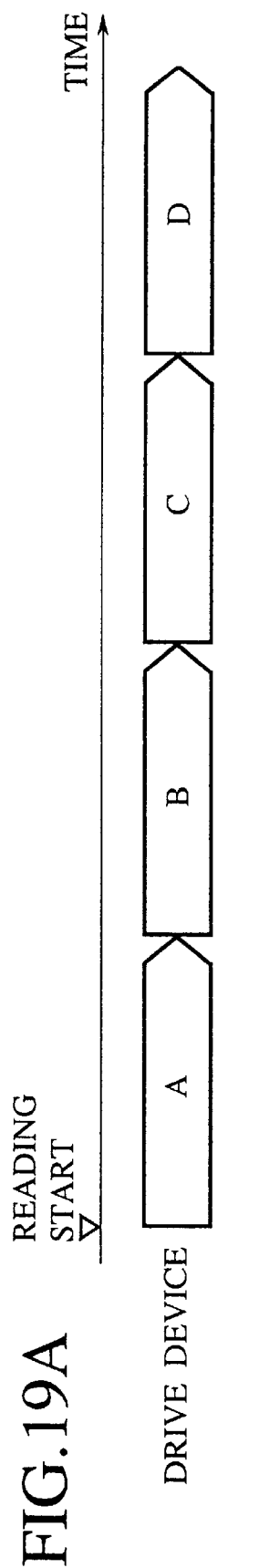
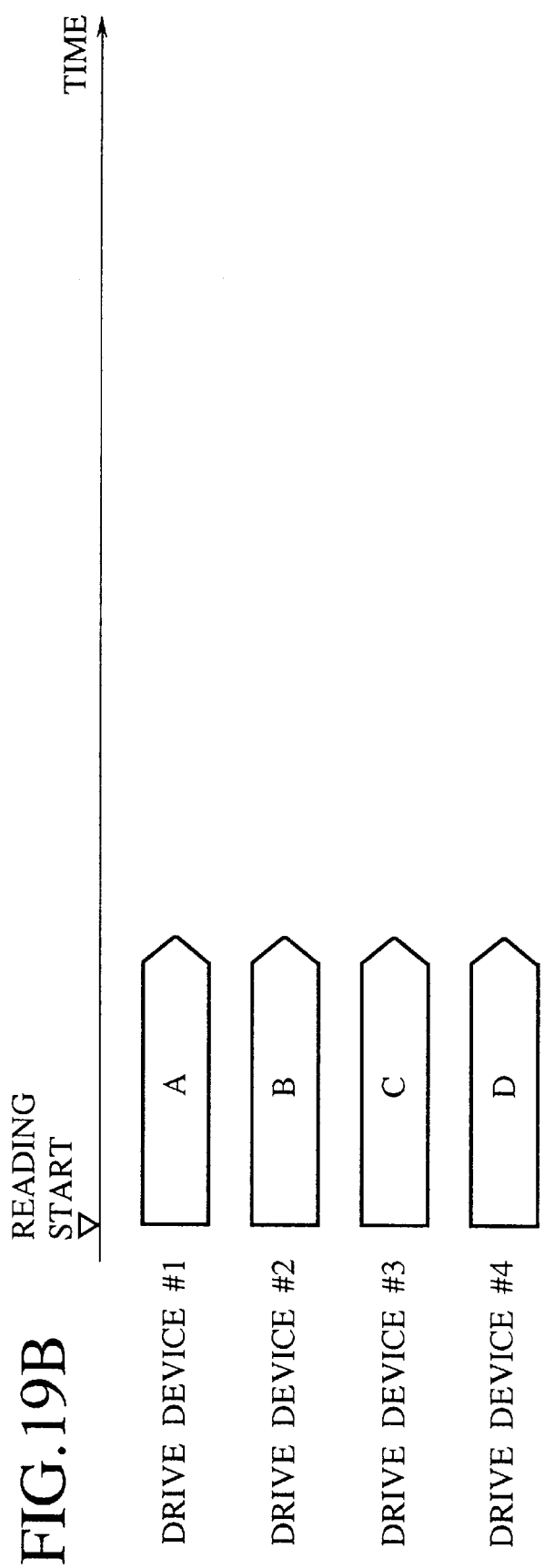
FIG.19A
FIG.19B

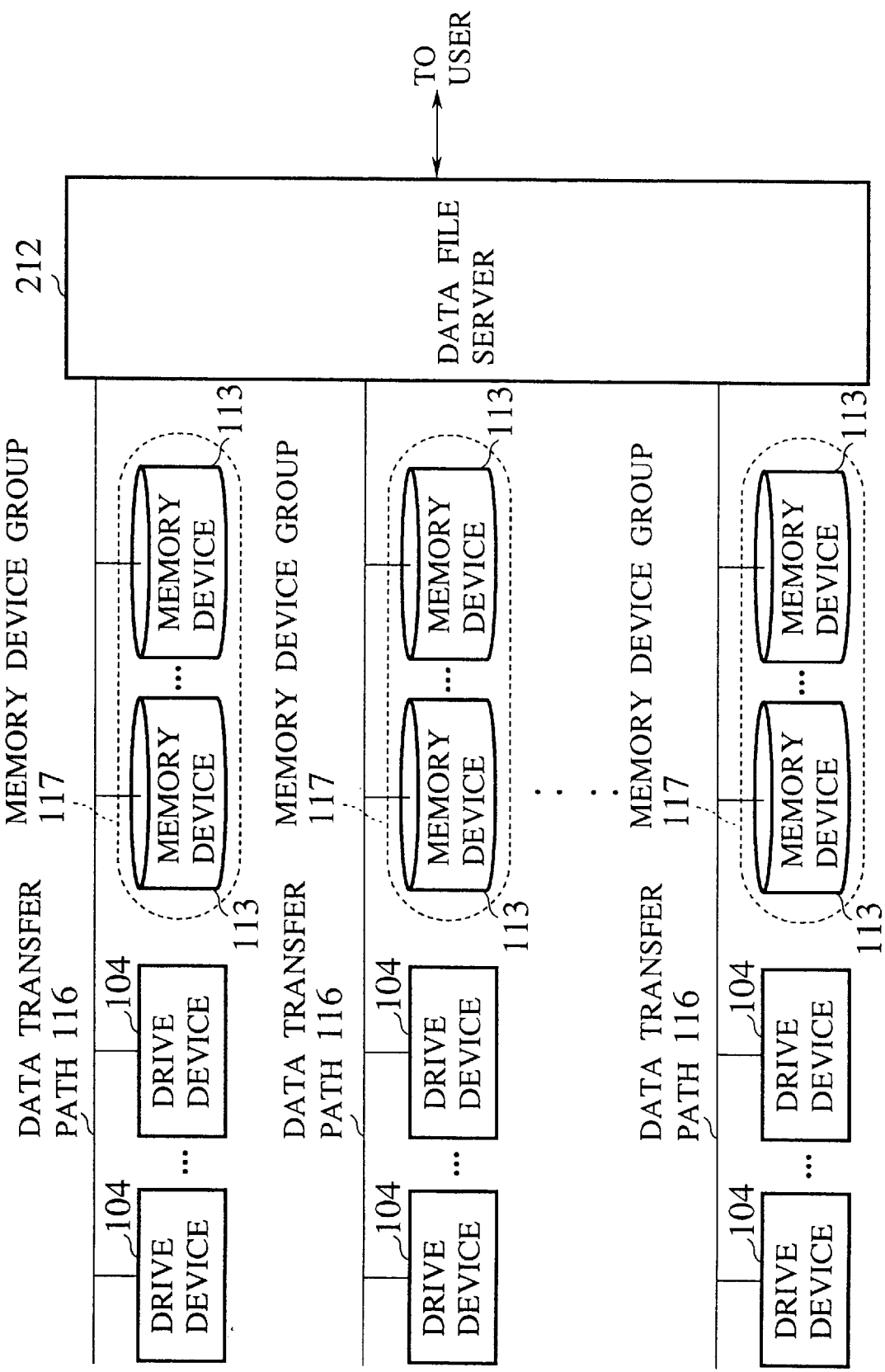

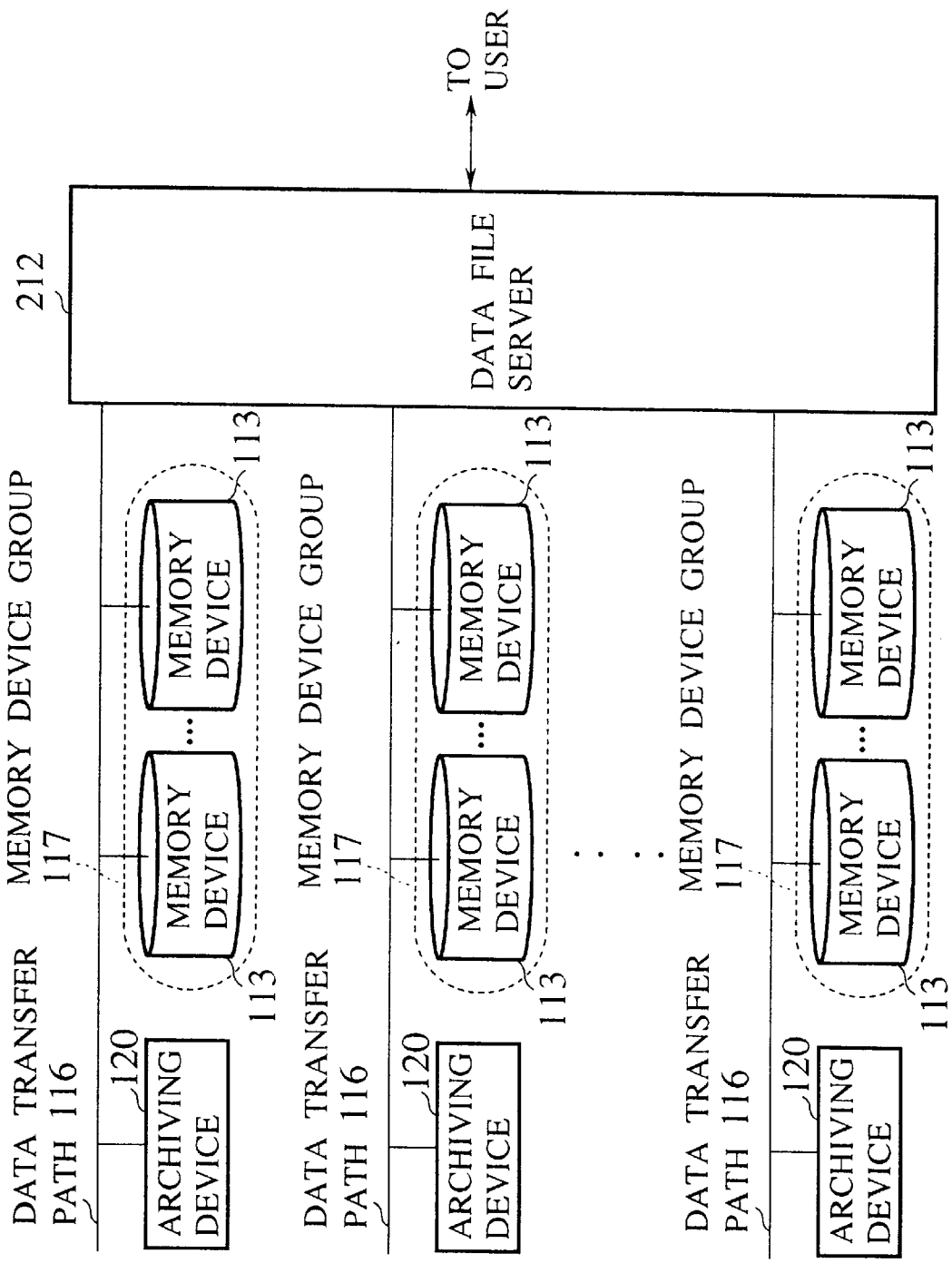

ARCHIVING DEVICE AND DATA FILE SERVER USING DATA FILE RECORDED IN DIVISION OVER RECORDING MEDIA

BACKGROUND OF THE INVENTION

1. Field of the Invention

The present invention relates to an archiving device and a data file server for managing and storing data files by using removable recording media.

2. Description of the Background Art

A data file server for storing a large amount of data files and delivering a desired data file according to a request from a user has been widely used recently. Such a data file server can be used in various applications such as WWW (World Wide Web) system, VOD (Video On Demand) system, electronic mail system, and database system.

Here, the data file refers to a collection of data such as videos, speeches, texts, static images, and programs.

For example, in the VOD system, video data of a large number of visual programs such as movies are stored as data files in recording media, and video data of a desired program is delivered according to a request from a user. In a system such as the VOD system, a large amount of videos data are recorded in many recording media at a device called video server, and these video data are selectively read out according to requests from users.

It is well known that a high cost performance system for the data file server can be realized by recording data files into different types of memory devices according to their utilization frequencies. For example, in a case of the VOD system, data files with high utilization frequencies such as those of the video data of newly released popular movies are recorded in memory devices such as magnetic disk devices (hard disk devices) for which an access time is short and a data transfer rate is high even though a recording cost per unit memory capacity is high.

Here, the access time refers to a time required since a reading request for a data file is received until a transfer of that data file begins, i.e., a seek time. This seek time can be short for a magnetic disk device as it is on-line connected. The data transfer rate refers to a rate by which data files are read out from a memory device continuously, i.e., a throughput. Usually, the data transfer rate is higher for a magnetic disk device than for an optical disk device, and the data transfer rate is even higher for a semiconductor memory than for a magnetic disk device. In order to deal with data files with extremely high utilization frequency, there are cases which use a semiconductor memory for which an access time is very short and a transfer rate is very high even though a recording cost per unit memory capacity is even higher.

On the other hand, data files with low utilization frequencies are recorded in memory devices such as those using magnetic tapes, optical disks, magneto-optical disks, phase change type optical disks, etc., for which an access time is long and a transfer rate is low but a recording cost per unit memory capacity is low.

Unlike the magnetic disk device, these memory devices have a structure in which recording media such as magnetic tapes or disks are removable, that is, recording media can be freely loaded into or unloaded from drive devices (drives) for carrying out data reading/writing. With this structure, the recording cost per unit memory capacity is basically a cost of recording media, so that, a considerable reduction of the recording cost is possible compared with a non-removable type memory device such as a magnetic disk device in which the recording medium and a drive device are provided integrally. On the other hand, in such a memory device using removable recording media, when a reading request for a data file is received, the reading cannot be carried out until a recording medium which records the requested data file is loaded into a drive device, so that the access time becomes longer compared with the magnetic disk device.

One way of constructing such a data file server having different types of memory devices is a scheme for connecting an archiving device to a data file server having a memory device using magnetic disks. The archiving device has one or more of drive devices for reading data from removable recording media such as optical disks and magnetic tapes, and functions to read out a necessary data file and returns it to the data file server in response to a request from the data file server. Some archiving device also has a robot device for loading removable recording media into drive devices and a storehouse for storing removable recording media. Some archiving device also has a function to manage data files stored in the storehouse, and load a necessary removable recording medium into the drive device by using the robot device, by judging which removable recording medium records the data file requested from the data file server.

Another way of constructing a data file server having different types of memory devices is a scheme for equipping the data file server itself with one or more drive devices for removable recording media. In this case, the data file server reads out a necessary data file on the removable medium by itself by using its own drive device. Some data file server according to this scheme also has a robot device for loading removable recording media into drive devices and a storehouse for storing removable recording media. Some data file server according to this scheme also has a function to manage data files stored in the storehouse, and load a necessary removable recording medium into the drive device by using the robot device, by judging which removable recording medium records the requested data file requested.

Now. in the data file server, a data file with high access frequency is often recorded over a plurality of magnetic disk devices. This is a technique called striping, which enables many users to make accesses to the same portion or different portions of the same data file simultaneously. On the other hand, a data file with a low access frequency is recorded in a removable recording medium. When a requested data file is not recorded in a magnetic disk device and it becomes necessary to obtain this data file from a removable recording medium, this data file is read out by a drive device provided in the archiving device or the data file server, and transferred to a magnetic disk device.

In a case of transferring a data file recorded in a removable recording medium to a magnetic disk device, a scheme for sending data to a user while reading data file from a removable recording medium and a scheme for sending data to a user after reading of one data file is finished are available.

In the former scheme for sending while reading, a time required since a reading request from a user arrives until sending of data begins is determined by an access time of a drive device provided in the archiving device or the data file server. This time is shorter in the former scheme compared with the latter scheme for sending after reading is finished, but as sending of data begins before an entire data file is read into a memory device such as a magnetic disk device, there are cases in which it is impossible to deal with simultaneous requests for different portions of the same data file, or cases in which a use of a trick playback mode such as a fast forward mode must be limited in a case of a video server. In order to continue service without such a limitation, it is necessary to read an entire data file into a memory device as quickly as possible.

On the other hand, in the latter scheme for sending after reading is finished, a time required since a reading request from a user, arrives until sending of data begins can be long depending on an access time and a data transfer rate of a drive device provided in the archiving device or the data file server, but as sending of data takes place after an entire data file is transferred to a memory device such as a magnetic disk device which has a fast access speed, it is possible to send data even when a plurality of users request different portions of the same data file simultaneously. In addition, there is no limitation on a trick playback mode in a case of a video server. Even in this latter scheme, it is still necessary to read an entire data file into a memory device as quickly as possible.

In the conventional archiving device or data file server, a removable recording medium which records a requested data file is loaded into a drive device in response to a reading request from a user, and data are sequentially read out by this drive device. In this case, one data file is usually recorded in one removable recording medium, and read out from this recording medium by one drive device, so that it is impossible to read out data file faster than the maximum data transfer rate of the drive device.

For this reason, a time required in reading out a requested data file by the drive device provided in the archiving device or the data file server and transferring it to a magnetic disk device has conventionally been limited by a performance level of the drive device. Usually, the drive device for removable recording media such as optical disks has a data transfer rate lower than that of a memory device of the data file server such as a magnetic disk device. Consequently, it has been impossible conventionally to shorten the time required in reading a data file by the drive device provided in the archiving device or the data file server and transferring it into the magnetic disk device, because of the bottleneck presented by the drive device.

In addition, in a case of the data file server which records the data file over a plurality of magnetic disk devices by using the striping technique, a data transfer rate for a plurality of memory devices together seemingly becomes very high, but a data transfer rate of the drive device provided in the archiving device of the data file server remains unchanged, so that a data transfer rate difference becomes even greater.

Furthermore, the conventional archiving device adopts a measure for providing spare recording media for important data files in advance in order to deal with a situation in which it becomes impossible to read data from a disabled removable recording medium, but this measure is associated with problems of a high recording cost and an additional space required for storing the spare recording media.

SUMMARY OF THE INVENTION

It is therefore an object of the present invention to provide an archiving device capable of reducing a time required in reading out an requested data file.

It is another object of the present invention to provide a data file server capable of reducing a time required in reading out a requested data file from a removable recording medium and transferring it to a memory device.

It is another object of the present invention to provide a data file server capable of reducing a time required in reading out a requested data file from removable recording media and transferring it to a plurality of memory devices for storing data file by using a striping technique.

It is another object to the present invention to provide an archiving device and a data file server capable of easily dealing with a disabled removable recording medium without increasing according cost and a space required for storing removable recording media.

It is another object of the present invention to provide a data file server formed by an archiving device and a non-removable type memory device such as a magnetic disk device, which is capable of recovering data easily even in a case of a trouble in the memory device.

According to one aspect of the present invention there is provided an archiving device, comprising: a plurality of drive devices for reading out a plurality of data constituting one data file from a plurality of removable recording media in parallel; and control means for controlling data reading operations by the drive devices according to a reading request for a desired data file.

According to another aspect of the present invention there is provided a data file server, comprising: a plurality of memory devices for storing data files; transfer means for reading out a desired data file from the memory devices and transferring the read out desired data file to a request source according to a reading request for the desired data file given from the request source; a plurality of drive devices capable of reading out a plurality of data constituting one data file from a plurality of removable recording media in parallel; and writing means for writing more than one data read out by more than one of the drive devices in parallel, into the memory devices.

According to another aspect of the present invention, there is provided a set of articles of manufacture, comprising: a plurality of removable recording media for recording a plurality of data files, adapted to a reading of a desired data file by a plurality of drive devices connected with a computer upon being loaded into said plurality of drive devices; each removable recording medium mixedly records a plurality of data obtained by dividing each one of said plurality of data files.

According to another aspect of the present invention, there is provided a set of articles of manufacture, comprising: a plurality of removable recording media for recording one data file, adapted, to a reading of said one data file by a plurality of drive devices connected with a computer upon being loaded into said plurality of drive devices; each removable recording medium records data obtained by dividing said one data file, and said plurality of removable recording media record said one data file by using a striping technique.

According to another aspect of the present invention, there is provided a set of removable recording media for recording a plurality of data files, adapted to a reading of a desired data file by a plurality of drive devices connected with a computer upon being loaded into said plurality of drive devices, comprising: a data structure recorded in the removable recording media in which each data file is recorded in division over a plurality of removable recording media.

Other features and advantages of the present invention will become apparent from the following description taken in conjunction with the accompanying drawings.

BRIEF DESCRIPTION OF THE DRAWINGS

FIGS. 4A to 4C are diagrams showing schemes for dividing a data file to be recorded in each optical disk in the archiving device of FIG. 1.

FIGS. 5A to 5E are diagrams showing exemplary data contents recorded in a plurality of optical disks in the archiving device of FIG. 1.

FIG. 7 is a diagram showing an exemplary contents of a contents table in the control computer of FIG. 6.

FIG. 8 is a diagram showing an exemplary contents of a reading request management table in the control computer of FIG. 6.

FIGS. 10A to 10E are diagrams showing one exemplary data contents recorded in a plurality of optical disks in the overall system configuration of FIG. 2 or FIG. 3.

FIGS. 11A to 11E are diagrams showing one exemplary data contents recorded in a plurality of magnetic disk devices in the overall system configuration of FIG. 2 or FIG. 3, in correspondence to the exemplary data contents of FIGS. 10A to 10E.

FIGS. 12A to 12E are diagrams showing another exemplary data contents recorded in a plurality of optical disks in the overall system configuration of FIG. 2 or FIG. 3.

FIGS. 13A to 13E are diagrams showing another exemplary data contents recorded in a plurality of magnetic disk devices in the overall system configuration of FIG. 2 or FIG. 3, in correspondence to the exemplary data contents of FIGS. 12A to 12E.

FIGS. 19A and 19B are diagrams showing the operation to read the optical disk of FIG. 18 by the conventional archiving device and the archiving device of FIG. 14, respectively.

FIG. 25 is a schematic block diagram of another embodiment of a data file server according to the present invention.

FIG. 26 is a schematic block diagram of another embodiment of a data file server according to the present invention.

DETAILED DESCRIPTION OF THE PREFERRED EMBODIMENTS

Referring now to FIG. 1 to FIGS. 13A to 13E, the first embodiment of an archiving device according to the present invention will be described. This first embodiment is directed to an exemplary case of an archiving device which uses optical disks as removable recording media.

Figure 1:
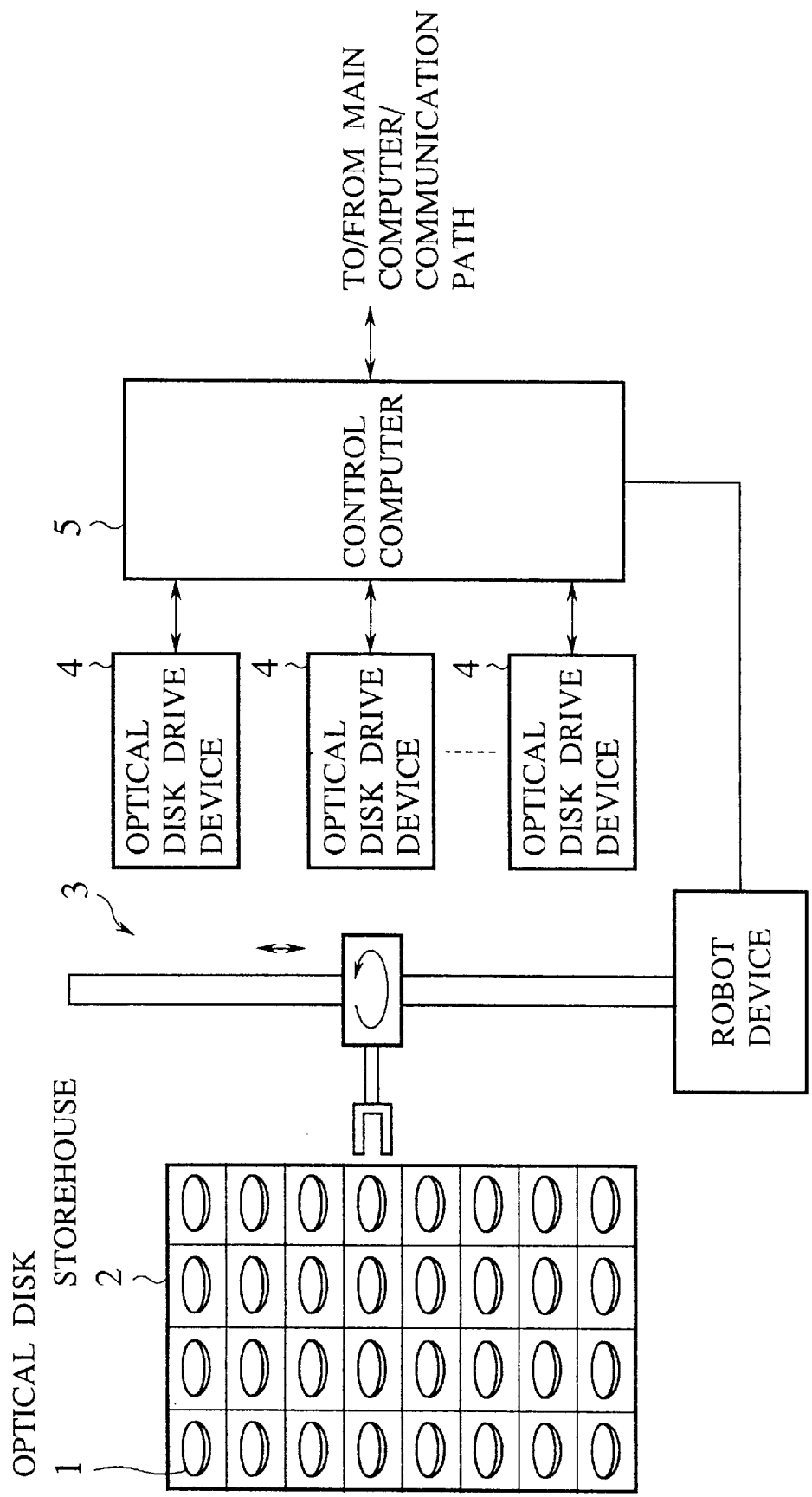
FIG. 1 is a schematic block diagram of the first embodiment of an archiving device according to the present invention.

The archiving device according to this first embodiment has a schematic configuration as shown in FIG. 1, where a plurality of optical disks 1 as removable recording media are stored in a storehouse 2. Here, the optical disk 1 can be either a read only recording medium such as CD-ROM, or a read/write possible recording medium such as a magneto-optical disk or a phase change type optical disk. A data file such as a video file which contains a series of continuous data is recorded in division over a plurality of optical disks 1 as will be described below. Also, the optical disk 1 may be cased inside a cartridge it desired.

A robot device 3 is controlled by a control computer 5, and carries out operations for loading the optical disk 1 stored in the storehouse 2 selectively into one of optical disk drive devices 4, or returning the optical disk 1 loaded in an optical disk drive device 4 back to the storehouse 2.

Each optical disk drive device 4 is controlled by the control computer 5, and carries out operations for reading data recorded in the optical disk loaded by the robot device 3, or writing or rewriting data into the loaded optical disk if necessary.

The control computer 5 is connected to a main computer to be described below, either directly or via a communication path, and carries out controls of the robot device 3 and the optical disk drive devices 4 under a control of the main computer, as well as a transfer of data read out from the optical disk by the optical disk drive device 4 and a transfer of data to be written into the optical disk by the optical disk drive device 4.

Namely, the control computer 5 manages information as to which data is recorded in which optical disk, and decides which optical disk should be loaded into which optical disk drive device 4 according to a reading request for a data file received from the main computer. Then, according to this decision, the control computer 5 selects at least one optical disk 1 stored in the storehouse 2 while selecting at least one optical disk drive device 4, and controls the robot device 3 to load the selected optical disk 1 into the selected optical disk drive device 4. In addition, the control computer 5 has a function to transfer data read out from the optical disk 1 by the optical disk drive device 4 to the main computer which issued the reading request. This control computer 5 will be described in further detail below.

Figure 2:
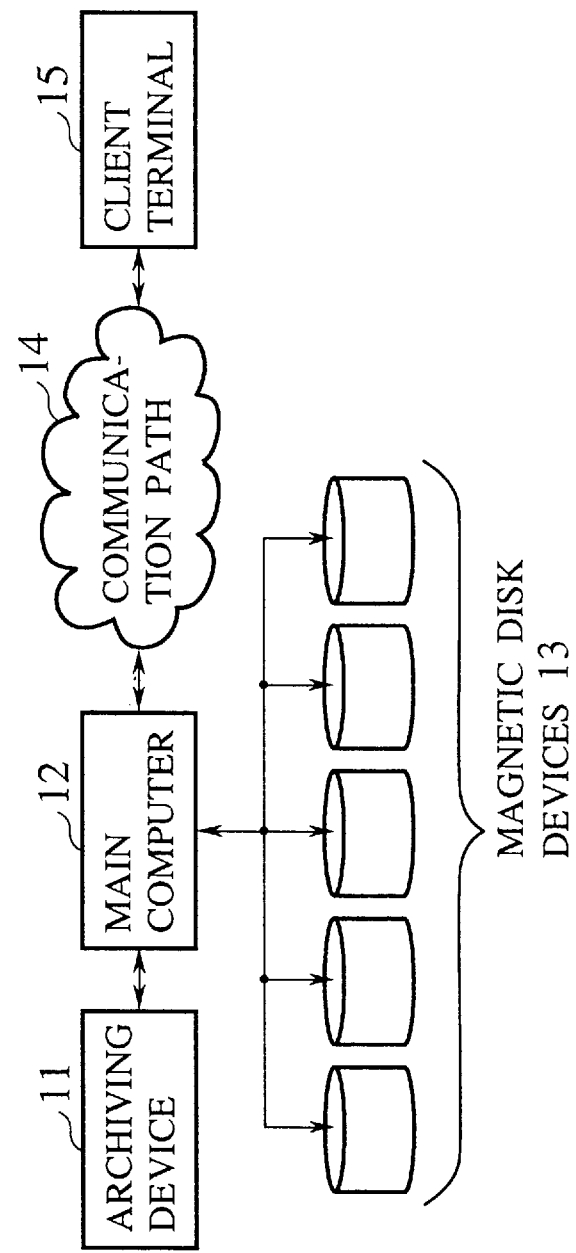
FIG. 2 is a schematic block diagram of an overall system configuration showing one possible manner of utilizing the archiving device of FIG. 1.
Figure 3:
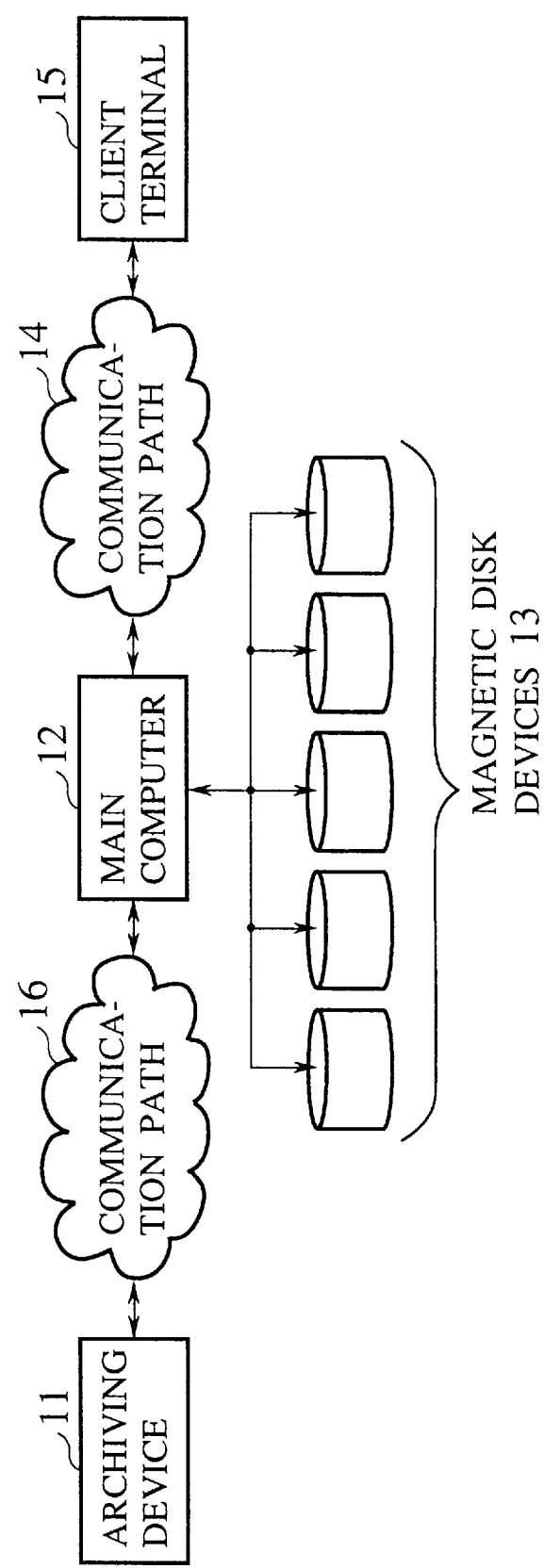
FIG. 3 is a schematic block diagram of an overall system configuration showing another possible manner of utilizing the archiving device of FIG. 1.

This archiving device of FIG. 1 is to be used as an auxiliary memory device for the main computer which processes reading request for a data file received from a client terminal (such as a user terminal or computer). FIG. 2 and FIG. 3 show exemplary manners of utilizing this archiving device.

In an example shown in FIG. 2, the archiving device 11 is connected with the main computer 12 through a dedicated interface. The main computer 12 is also connected with magnetic disk devices (hard disk devices) 13 as additional, auxiliary memory devices. Also, the main computer 12 is connected with a client terminal 15 through a communication path 14.

In an example shown in FIG. 3, the archiving device 11 itself has a communication interface, and this archiving device 11 is connected with the main computer 12 through a communication path 16. The rest of FIG. 3 is the same as FIG. 2. According to this configuration of FIG. 3, it is also possible for a plurality of main computers to share the same archiving device through the communication path.

Next, a scheme for recording a data file into optical disks 1 in this first embodiment will be described.

A conventional archiving device using optical disks basically adopts a scheme for recording one data file in one optical disk. When a size of one data file is smaller than a capacity of one optical disk, a plurality of data files are stored in one optical disk if possible. On the contrary, when a size of one data file is larger than a capacity of one optical disk, this data file is divided into pieces each of which fits into one optical disk, and recorded over a plurality of optical disks.

In contrast, in the archiving device of the present invention, each data file is divided into a plurality of data regardless of its size, and recorded over a plurality of optical disks. FIGS. 4A, 4B, and 4C show a data division scheme used in the archiving device of this first embodiment. Suppose that a data file A comprises a plurality of blocks a1 to a16 as shown in FIG. 4A. In FIG. 4A, one data file A comprises 16 blocks, but there can be cases in which a number of blocks forming one data file is greater than 16 depending on a size of each block. Here, for example, each block can be in a size of one byte, a size of 8k bytes, a size equal to a unit of reading from the optical disk 1, or a size equal to an integer multiple of a unit of reading from the optical disk 1.

In a case of recording this data file A in division over a plurality of optical disks 1, either one of two schemes as shown in FIG. 4B and FIG. 4C can be used. Note that FIG. 4B and FIG. 4C show an exemplary case of recording the data file A in division over four optical disks 1.

FIG. 4B shows a scheme for dividing the data title A such that time-wise consecutive blocks are recorded in each optical disk. Namely, the data file is divided into four data A1, A2, A3 and A4, where each of these data A1, A2, A3 and A4 contains a plurality (four in this case) of blocks which are consecutive in time, that is, a1 to a4, a5 to a8, a9 to a12, a13 to a16, respectively.

According to this scheme, when only one optical disk drive device is available for reading of this data file A, all the data A1, A2, A3 and A4 which constitute this data file A can be sequentially read out by carrying out the reading from four optical disks one by one. On the other hand, when four optical disk drive devices are available for reading of this data file A, all the data A1, A2, A3 and A4 can be read out four times faster, but it is necessary to combine the read out blocks after the reading in this case, because the blocks read out by the four optical disk drive devices simultaneously are not consecutive in time.

FIG. 4C shows a scheme for dividing the data file A such that time-wise consecutive blocks are recorded in different optical disks. Namely, the data file A is divided into four data A1, A2, A3 and A4, where each of these data A1, A2, A3 and A4 contains four blocks each of which is a fourth block from an adjacent block in a time-wise consecutive order. For instance, data A1 comprises four blocks a1, a5, a9 and a13.

In this scheme, when only one optical disk drive device is available for reading of this data file A, in order to read out data in a time-wise consecutive order, it is necessary to switch a reading target optical disk every time one block is read out, so that frequent switchings of optical disks are required and an efficiency is poor. However, when there is no need to read out data in a time-wise consecutive order, frequent switchings of optical disks are unnecessary as it suffices to combine the read out blocks after the reading.

On the other hand, when four optical disk drive devices are available for reading of this data file A, the time-wise consecutive blocks can be read out four times faster than the scheme of FIG. 4B, because four time-wise consecutive blocks can be read by four optical disk drive devices simultaneously. Note however that a total time required for reading out the entire data file is the same as in the scheme of FIG. 4B.

Four data A1, A2, A3 and A4 obtained by dividing one data file A into four in the above described manner are recorded into four optical disks D1, D2, D3 and D4 as shown in FIGS. 5A, 5B, 5C and 5D, respectively, among many optical disks 1 provided in the archiving device of FIG. 1. Namely, the data file A is divided into four data A1 to A4 and recorded over four optical disks D1 to D4, and another data file B is similarly divided into four data B1 to B4 and recorded over four optical disks D1 to D4.

Now, in a case of recording one data file in division over a plurality of optical disks, when even one of these optical disks is disabled, the correct reading of the entire data file becomes impossible. This is the same in a conventional case of recording the entire data file into one optical disk. In order to deal with such a trouble, a conventional used measure has been to provide spare optical disks which record the same data file as described above. However, according to this measure, there are problems in that the recording cost becomes at least twice as high, and that a space required for storing the spare optical disks also increases accordingly.

In order to resolve these problems, in the archiving device of this first embodiment, each data file is recorded in division over a plurality of optical disks as described above, and in addition, a parity (exclusive OR) among corresponding bits of data recorded in these optical disks is calculated and recorded in another optical disk D5 different from the optical disks D1, D2, D3 and D4 for recording the data, as in a case of parities pA and pB for the data files A and B shown in FIG. 5E.

With this provision, when any one of the optical disks D1, D2, D3 and D4 which record a plurality of data constituting the data file is disabled, it becomes possible to recover data recorded in the disabled optical disk by carrying out a parity calculation using data recorded in the remaining optical disks and the parity recorded in the optical disk D5.

Here, in a case of dividing one data file into four and recording that data file over four optical disks D1, D2, D3 and D4 as shown in FIGS. 5A to 5D for example, it is possible to realize the anti-trouble measure by merely adding one optical disk D5 for parity recording, i.e., by only 25% increase of the recording cost.

Also, in this first embodiment, as shown in FIGS. 5A to 5D, the optical disks D1, D2, D3 and D4 for data recording store data obtained by dividing each of a plurality (two in this example) data files A and B into a plurality of portions (four in this example). Namely, the data file A is recorded in division into four data A1, A2, A3 and A4 over four optical disks D1, D2, D3 and D4, and the data file B is recorded in division into four data B1, B2, B3 and B4 over four optical disks D1, D2, D3 and D4.

At this point, the data A1 and B1 for top portions of the data files A and B, i.e., the data containing top blocks a1 and b1, are recorded in different optical disks D1 and D3, for example. By recording the data files A and B with their respective top portion data recorded in different optical disks, even when there are simultaneous reading requests for the data files A and B, it is possible to read the data A1 which contains the top block a1 of the data file A from the optical disk D1, while simultaneously reading the data B1 which contains the top block b1 of the data file B from the optical disk D3.

Namely, if the data A1 and the data B1 are recorded in the same optical disk, the reading of the data file A and the reading of the data file B cannot be carried out simultaneously, and it would be necessary to read them sequentially. In contrast, when the data A1 and the data B1 which contain the respective top blocks of the data files A and B are recorded in different optical disks D1 and D3, it is possible to read these data files A and B simultaneously, so that the reading time can be reduced to ½.

Next, the control computer 8 in the archiving device of FIG. 1 will be described in detail.

In the configuration of FIG. 1, the control computer 5 selects at least one optical disk drive device among a plurality of optical disk drive devices 4 while selecting at least one optical disk from a plurality of optical disks 1, and carries out a control to read out selected data according to a reading request from a main computer.

Namely, the control computer 5 carries out the scheduling for reading data from which optical disk among the optical disks 1 by using which optical disk drive device among the optical disk drive devices 4. In this case, as described below, how many optical disk drive devices are to be allocated to the reading of each data file is determined according to priority levels of the reading requests for a plurality of data files given from the main computer to the archiving device and transfer rates required in transferring data from the archiving device to the main computer.

For example, to the data file corresponding to a reading request with a high priority level for, which the entire data must be read out as quickly as possible, the control computer 5 allocates many optical disk drive devices so that data of that data file can be read out simultaneously from all the optical disks in which data of that data file are recorded. On the other hand, the data file corresponding to a reading request with a low priority level, the control computer 5 allocates one or few optical disk drive devices so that data of that data file are read out sequentially from all the optical disks in which data of that data file are recorded. In a case where all the drive devices are currently used by other reading requests with higher priority levels, the reading request is kept awaiting until there is an available drive device.

Note however that it is preferable to allocate as many optical disk drive devices as available even to the data file corresponding to the reading request with a low priority level as long as there is an available optical disk drive device.

Also, in a case where there is no available optical disk drive device when a reading request with a high priority level occurs, the loaded optical disk is taken out from the optical disk drive device which is currently used for reading data for the data file corresponding to the reading request with a low priority level, and the optical disk which records data of the data file corresponding to the just occurred reading request with a high priority level is loaded into that optical disk drive device instead, so that data of that data file will be read out first.

In addition, in a case where there is a need to recover data by using parity in the optical disk D5 for parity recording as there is a disabled optical disk among the optical disks D1 to D4 for data recording which records data of data file corresponding to the occurred reading request, it is preferable to allocate the optical disk drive devices such that it is possible to read out data from all the optical disks for data recording other than the disabled optical disk, while reading the parity from the optical disk D5 for parity recording. In such a situation, the priority level of the reading request for the data file which contains data recorded in the disabled optical disk is raised to the highest priority level, for example, and the optical disk drive devices are allocated to the optical disks recording data of that data file and the optical disk recording the parity of that data file.

Also, preferably, the data read out while recovering it by using the parity in the above described manner is written into a freely rewritable optical disk such as a magneto-optical disk or a phase change type optical disk, or an only once writable optical disk such as a write once type optical disk, by an available optical disk drive device having a writing function, while being transferred to a source of the reading request for the data file. With this provision, it is possible to produce a substitute disk for the disabled disk. This production of the substitute disk may also be carried out by utilizing an idle time where there is no reading request.

Next, the further detail of the control computer 5 in this first embodiment will be described. Here, it is assumed that the archiving device has 10 optical disk drive devices as the optical disk drive devices 4. Also, it is assumed that each data file such as a video file which is managed by the archiving device is recorded in division over four optical disks D1, D2, D3 and D4 among many optical disks 1 as shown in FIGS. 5A to 5D, and a parity among corresponding bits of data recorded in these optical disks D1, D2, D3 and D4 is recorded in another optical disk D5 as shown in FIG. 5E.

Figure 6:
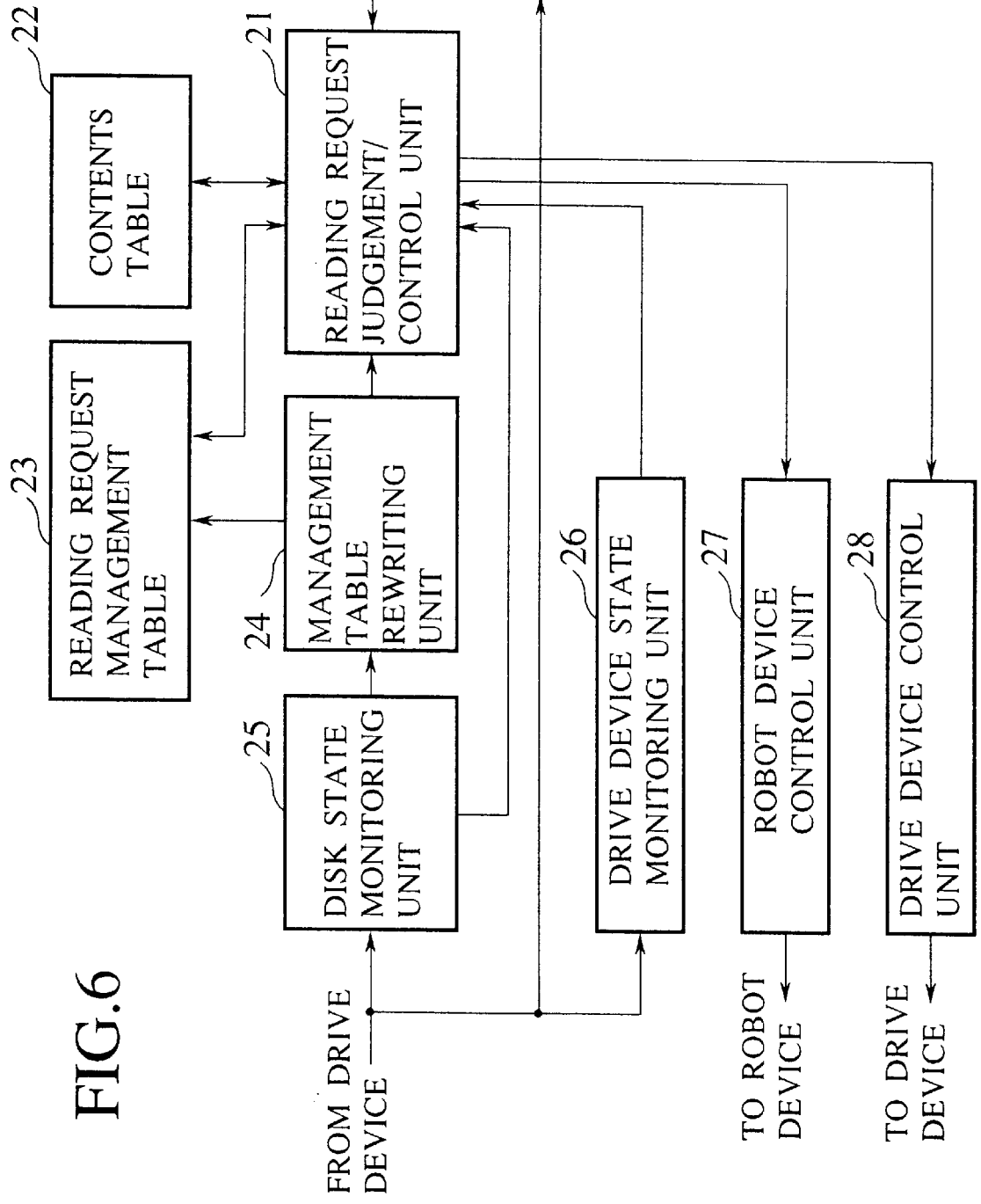
FIG. 6 is a functional block diagram of a control computer in the archiving device of FIG. 1.

FIG. 6 shows a functional block diagram of the control computer 5, which comprises a reading request judgement/control unit 21, a contents table 22, a reading request management table 23, a management table rewriting unit 24, a disk state monitoring unit 25, a drive device state monitoring unit 26, a robot device control unit 27, and a drive device control unit 28.

The reading request judgement/control unit 21 receives a reading request sent from the main computer or the communication path, and carries out various control operations as described below according to the received reading request.

The contents table 22 is a memory device such as RAM or magnetic disk device which stores information concerning contents of data files recorded in the optical disks 1. The reading request management table 23 is a rewritable memory device such as RAM or magnetic disk device which stores a state concerning contents of a video file which is currently in a process of reading by the archiving device upon receiving the reading request. These contents table 22 and reading request management table 23 will be described in further detail below.

The management table rewriting unit 24 rewrites contents of the reading request management table 23 under the control of the reading request judgement/control unit 21.

The disk state monitoring unit 25 monitors whether the optical disk 1 is disabled or not, and records a result of this monitoring, where this monitoring can be realized by judging whether the reproduced signal from the optical disk 1 is in an abnormal state or not for example. The drive device state monitoring unit 26 monitors an operation state of the optical disk drive device 4 as to whether it is currently idle or not, i.e., whether it is currently carrying out the reading or writing by having the optical disk 1 loaded therein or not.

The robot device control unit 27 is controlled by the reading request judgement/control unit 21, and carries out a control for the loading of an appropriate optical disk 1 into the optical disk drive device 4 and the unloading of the optical disk 1 from an appropriate optical disk drive device 4 by the robot device 3. The drive device control unit 28 is controlled by the reading request judgement/control unit 21, and carries out a control of the optical disk drive devices 4.

FIG. 7 shows exemplary contents of the contents table 22. This contents table 22 stores contents titles of all the video files stored and managed by the archiving device, and various information concerning five optical disks D1 to D5 which record data and parity of the data file for each contents title. Here, the optical disks D1 to D5 are five disks which are selected from many optical disks 1.

More specifically, the information concerning the optical disks D1 to D5 includes: (1) a disk number assigned to each optical disk, (2) a start block number indicating a block number of a block from which data of the data file for the corresponding contents are recorded on each disks and (3) a length of data or parity of the data file for the corresponding contents on each disk which is expressed in terms of a number of blocks. This information is recorded in correspondence to the contents title. Here, the block is a unit of reading from the optical disk, such as blocks a1 to a16 shown in FIG. 4A for the data file A for example.

To be more concrete, FIG. 7 shows an exemplary case in which the data files are video files for movies, where a video file for a movie A has its data recorded in 50 blocks region starting from the 100th block of each one of the optical disks with disk numbers 10 to 13, and its parity recorded in 50 block region starting from the 100th block of the optical disk with a disk number 14.

Also, when a video file for a movie A is formed by blocks a1 to a200 and recorded by using the data division scheme as shown in FIG. 4C described above, for example, the optical disk with a disk number 10 records blocks a1, a5, a9, a13, and so on, the optical disk with a disk number, 11 records blocks a2, a6, a10, a14, and so on, the optical disk with a disk number 12 records blocks a3, a7, a11, a15, and so on, and the optical disk with a disk number 14 records blocks a4, a8, a12, a16, and so on.

Similarly, when a video file for a movie B is formed by blocks b1 to b200 and recorded by using the data division scheme as shown in FIG. 4C described above, for example, the optical disk with a disk number 25 records blocks b1, b5, b9, b13 and so on, the optical disk with a disk number 26 records blocks b2, b6, b10, b14, and so on, the optical disk with a disk number 27 records blocks b3, b7, b11, b15, and go on, and the optical disk with a disk number 28 records blocks b4, b8, b12, b16, and so on.

FIG. 8 shows exemplary contents of the reading request management table 23. This reading request management table 23 stores (1) a contents title of each video files which is currently read out, (2) a priority level of a reading request for the data file having that contents title, and (3) block number to be read out next for each of five optical disks D1 to D5 which record data and parity of the video file for the corresponding contents. For example, it is indicated that, among the optical disks D1 to D5 corresponding to the movie B, the block to be read out next from the optical disk D2 is the 220th block. Also, among the optical disks D1 to D5 corresponding to the movie D, the block to be read out next is indicated as −1th block, which indicates the fact that there is no need to read out the party information recorded in this disk D5.

The priority level recorded in the reading request management table 23 is higher for a smaller value. It is possible to adopt a scheme in which this priority level is explicitly given by a side (the main computer, for example) which issues the reading request to the archiving device. Also, when one optical disk other than the optical disk D5 for parity recording is disabled among five optical disks D1 to D5 which record data and parity of the video file for the contents to be read out at the archiving device which received the reading request, for example, it is possible to adopt a scheme in which the priority level of the reading request for the video file of the contents whose part is recorded in the disabled optical disk is set to the highest value 1, while the priority level of the reading requests for the other video files are set to 2.

In addition, it is also possible to adopt both of the above described two schemes as a scheme for giving the priority level, such that the priority level is basically specified by a side which issues the reading request, but when there is a disabled optical disk, the priority level of the reading request corresponding to that disabled optical disk is set to the highest value regardless of the specified priority level.

The reading request management table 23 of FIG. 8 will now be described in further detail. Looking at the movie B first, it is indicated that the disk D3 among the optical disks D1 to D4 which record the video file of the movie B is disabled so that the reading is currently carried out at the highest priority while recovering the data recorded in the disabled disk D3 by using the parity recorded in the disk D5, and all of the optical disks D1, D2, D4 and D5 are, currently in a state of reading the 220th block. Namely, as the priority level of the reading request for the video file of the movie B is set to the highest value 1, the reading from the optical disks D1, D2, D4, and D5 by using four optical disk drive devices is currently in progress.

Also, it is indicated that the priority level of the reading request for the video file of the movie D is 2, and all of the optical disks D1, D2. D3 and D4 are currently in a state of reading the 50th block by using four optical disk drive devices.

Also, it is indicated that the priority level of the reading request for the video file of the movie E is 3, and this reading is in a waiting state at a stage where the 10th block is to be read out from each of the two optical disks D1 and D2 by two remaining optical disk drive devices among 10 optical disk drive devices provided, due to the occurrence of the reading request for the video file of the movie A which has a higher priority level. As for the reading request for the video file of the movie A, the reading is currently progressing at a state of reading the 130th block from each of the two optical disks D1 and D2 by using the two optical disk drive devices which became available by interrupting the reading of the video file of the movie E.

Figure 9A:
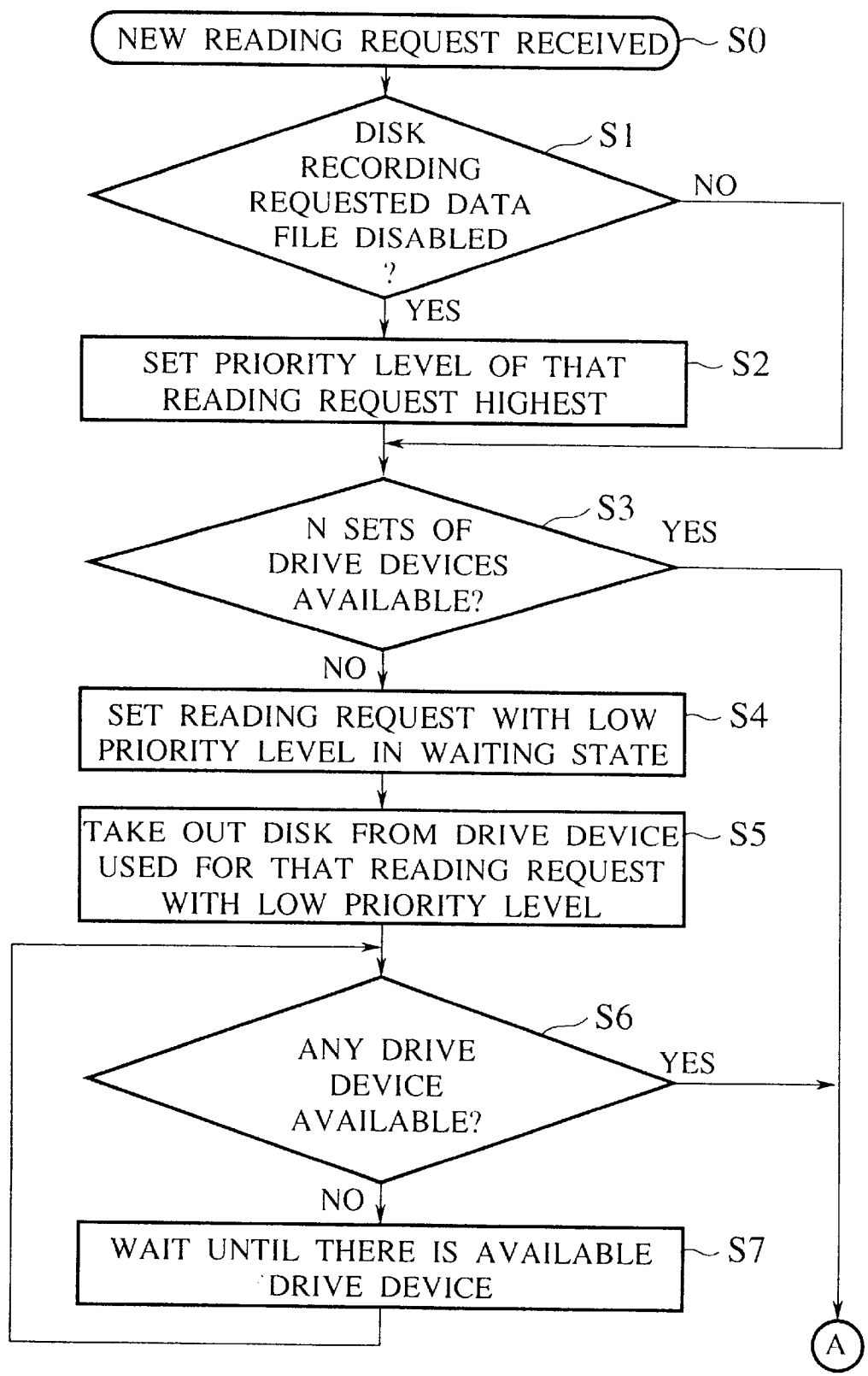
FIGS. 9A and 9B are a flow chart of a processing procedure for the control computer of FIG. 6.
Figure 9B:
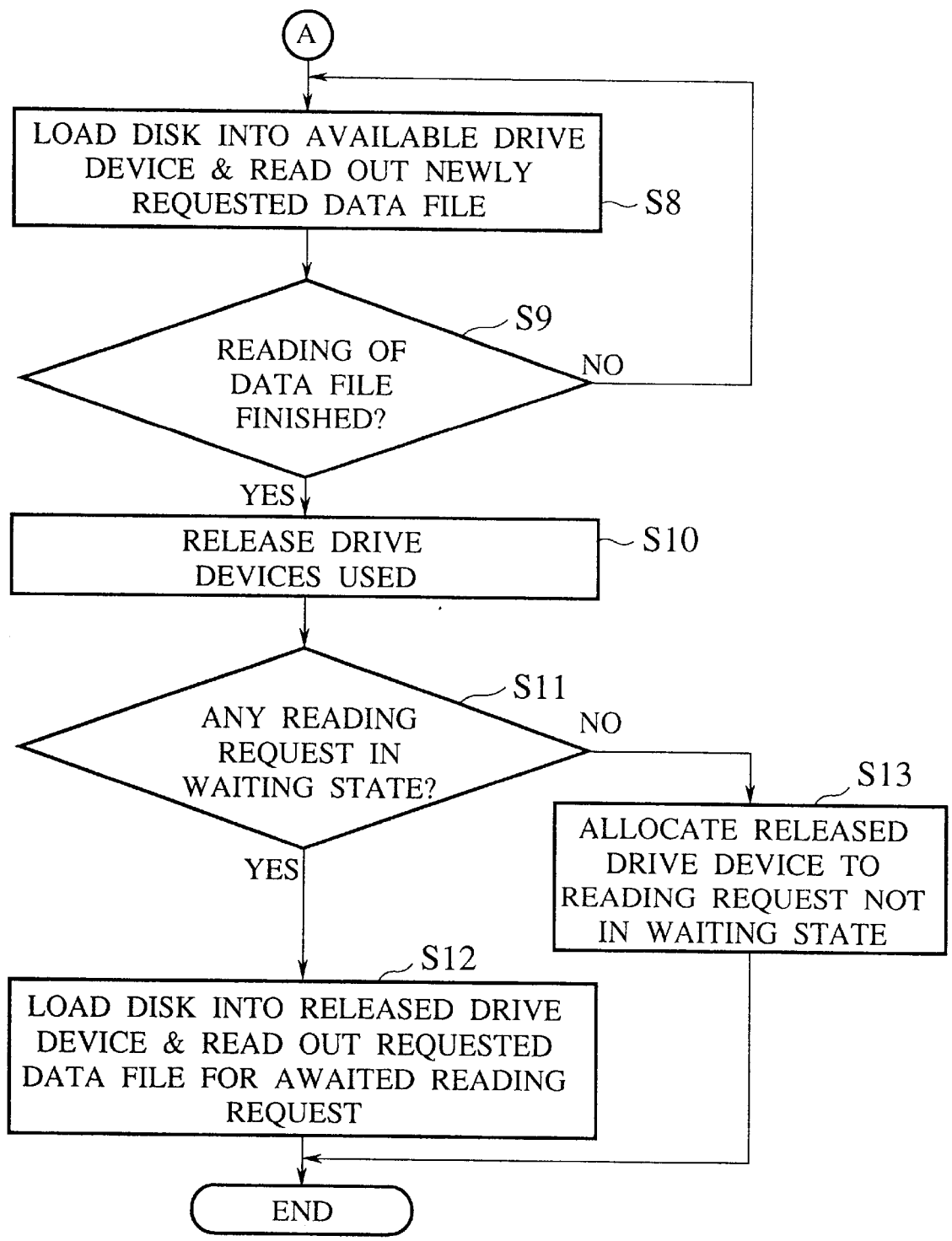

Next, the concrete example of the processing procedure for the control computer 5 will be described with reference to the flow chart shown in FIGS. 9A and 9B.

When a reading request for a video file of new contents is issued from the main computer, for example, the reading request judgement/control unit 21 receives this reading request (step S0). At this point, the reading request judgement/control unit 21 refers to the contents table 22 to check the disk numbers of the optical disks which are recording the video file of the requested contents, and sets up a start block in each of these optical disks from which the reading should start in the reading request management table 23.

In addition, the reading request judgement/control unit 21 checks whether these optical disks are disabled or not (step S1), and when any of these optical disks is disabled, rewrites the priority level in the reading request management table through the management table rewriting unit 24 so as to set the priority level of the corresponding reading request to the highest value 1 (step S2).

Here, the checking at the step S1 can be done in either one of the following two ways.

One way is to check all the disks (four disks excluding the parity disk in the example described below) corresponding to the received reading request at the disk state monitoring unit 25, by loading each one of these disks into the drive device for trial. Another way, which is more practical one, is to store an information on disks which were found by the disk state monitoring unit 25 as disabled ones when they were previously loaded into the drive devices (at the step S8 described below), and check this stored information. Note that at the step S8, when some disk is found to be disabled, as many drive devices (four in the example described below) as necessary for loading the other not disabled disks and the parity disk are secured to recover the data of the disabled disk, and the requested data file is read out after this data receovery.

Next, The reading request judgement/control unit 21 checks whether a necessary number N (four in this example) of the optical disk drive devices 4 required for reading of the video file from the optical disks 1 are available or not through the drive device state monitoring unit 26 (step S3). When a necessary number N of the optical disk drive devices 4 are not available, if there is any reading request having a lower priority level than the new reading request which is currently using the optical disk drive devices 4, this reading request with a low priority level is set in a waiting state (step S4).

Next, the reading request judgement/control unit 21 controls the robot device 3 through the robot device control unit 27 to take out the optical disk from the optical disk drive device which has been reading the video file of the contents for the reading request with a low priority level, so as to set this optical disk drive device in an idle state (step S5). Then, the reading request judgement/control unit 21 checks whether any optical disk drive device is available through the drive a device state monitoring unit 26 (step S6). If there is no available optical disk drive device, the reading is kept awaiting until there is an available optical disk drive device (step S7).

When a necessary number of optical disk drive devices are available at the step S3 or there is an available optical disk drive device at the step 86, the reading request judgement/control unit 21 controls the robot device 3 through the robot device control unit 27 such that the optical disks which record the video file of the contents corresponding to the received new reading request are loaded into the available optical disk drive devices, and controls these optical disk drive devices through the drive device control unit 28 to carry out the reading of the data of the video file recorded in these optical disks, and then the read out data are sent to the source which issued the reading request such as the main computer, for example (step S8). At this point, it is preferable to send each read out data by attaching an information which indicates a block to which this data belongs to, according to the need.

The reading request judgement/control unit 21 carries out the processing of the step S8 until all the data of the video file of the contents corresponding to the received new reading request are read out (step S9). Then, when it is judged that all the reading is finished at the step S9, the reading request judgement/control unit 21 releases the optical disk drive devices used for this reading, and controls the robot device 3 through the robot device control unit 27 to take out the optical disks from these optical disk drive devices (step S10).

Then, the reading request judgement/control unit 21 refers to the reading request management table 23 to check whether there is any reading request which is in the waiting state or not (step S11), and when there is a reading request which is in the waiting state, the reading for that reading request is resumed. Namely, the reading request judgement/control unit 21 controls the robot device 3 through the robot device control unit 27 to load the optical disks which are recording the data of the video file for the contents corresponding to that reading request in the waiting state into the optical disk drive devices released at the step S10, and controls these optical disk drive devices through the drive device control unit 28 to read out the data of the video file recorded in these optical disks (step S12).

Also, if there is any reading request which is not in the waiting state but for which less than four optical disk drive devices are used, the optical disk drive devices released at the step S10 are allocate to this reading request (step S13).

Here, the reading request for which the reading is to be resumed at the step S12 or the reading request for which the optical disk drive devices released at the step S10 are to be allocated at the step S13 is selected at a higher priority than the other reading request with higher priority levels.

Next, the preferable manner of utilizing the archiving device of this first embodiment will be described.

An often employed manner of utilizing the archiving device is, as shown in, FIG. 2 or FIG. 3 described above, a scheme in which the service is normally provided to the client terminal 15 by using the data file recorded in the magnetic disk devices 13 which are used as the auxiliary memory devices of the main computer 12, and when a data file not recorded in the magnetic disk devices 13 becomes necessary, that data file is read out from the archiving device 11 and transferred to the magnetic disk devices 13. Also, in this cases the striping scheme for recording data of one video file in division over a plurality of magnetic disk devices 13 is often employed in order to increase the transfer rate for the data reading/writing with respect to the magnetic disk devices 13.

Moreover, in addition to the simple striping, it is effective to use the so called RAID (Redundant Array of Inexpensive Disks) structure in which a parity (exclusive OR) of data recorded in division over a plurality of magnetic disk devices is calculated and recorded in another new magnetic disk device, so that when a trouble occurs in one magnetic disk device, data recorded in that troubled magnetic disk device can be recovered by calculating a parity.

In such a RAID structure, in a case of recovering the recorded content of the disabled magnetic disk device, a conventionally used procedure is to calculate a parity of the recorded contents of the other not disabled magnetic disk devices and write it into another magnetic disk device.

However, in this procedure, there is a need to read out data from the other not disabled magnetic disk devices, so that there has been a problem in that the reading from the magnetic disk devices in response to the other requests cannot be carried out during that period, and the amount of requests that can be served is lowered in such a case.

In order to resolve this problem, this first embodiment adopts a scheme in which, at a time of recovering the recorded content of the disabled magnetic disk device in another magnetic disk device, data to be recorded into that magnetic disk device is read out from the archiving device and written into that magnetic disk device. With this provision, it is possible to realize the recovery of data without burdening the other not disabled magnetic disk devices. In addition, this scheme can be adopted not just in a case of using the magnetic disk devices in the RAID structure but also in a case of using a simple striping alone.

For example, as shown in FIGS. 10A to 10E and FIGS. 11A to 11E, when data A1 obtained by dividing the data file A is formed by blocks a1 to a16, and these blocks a1 to a16 are recorded in division over four optical disks D1 to D4 as shown in FIGS. 10A to 10D, the same contents as the recorded contents of the optical disks D1 to D4 are also recorded in the magnetic disk devices M1 to M4 as shown in FIGS. 11A to 11D. Also, in the optical disk D5 and the magnetic disk device M5, the parities p1 to p4 for the data recorded in the optical disks D1 to D4 and the magnetic disk devices M1 to M4 are recorded as shown in FIGS. 10E and 11E.

Here, in a case of replacing the disabled magnetic disk device M3 by a new magnetic disk device, the content recorded in the magnetic disk device M3 is read out from the optical disk 13 and written into the new magnetic disk device. In this manner, by using the same data division scheme on the optical disks and on the magnetic disk devices, it becomes possible to easily recover data recorded in the disabled magnetic disk device at a time of a trouble in the magnetic disk device.

In addition, as shown in FIGS. 12A to 12E and FIGS. 13A to 13E, it is also possible to use a scheme in which data to be recorded in one magnetic disk device is recorded in a plurality of optical disks. Namely, as shown in FIGS. 12A to 12D, each of the optical disks D1 to D4 records four consecutive blocks among blocks a1 to a16 forming the data A1 obtained by dividing the data file A.

On the other hand, as shown in FIGS. 13A to 13D, each of the magnetic disk devices M1 to M4 records one of the four blocks stored in each of the optical disks D1 to D4. For example, the magnetic disk device M1 records blocks a1, a5, a9, and a13 which are respectively stored in the optical disks D1, D2, D3, and D4. Also, in the optical disk D5 and the magnetic disk device M5, the parities p1 to p4 and the parities q1 to a4 for the data recorded in the optical disks D1 to D4 and the magnetic disk devices M1 to M4, respectively, are recorded as shown in FIGS. 12E and 13E.

According to this scheme shown in FIGS. 12A to 12E and FIGS. 13A to 13E, when the magnetic disk device M3 is disabled, for example, the recorded content of the magnetic disk device M3 is recovered by using the data read out from the optical disks D1 to D4. In general, the data transfer rate of the optical disk drive device is lower than the data transfer rate of the magnetic disk device, so that by adopting this recording scheme, it is possible to realize the recovery of data faster than the recording scheme of FIGS. 10A to 10E and FIGS. 11A to 11E when a plurality of optical disk drive devices are available for the data recovery.

Referring now to FIG. 14 to FIGS. 19A and 19B, the second embodiment of an archiving device according to the present invention will be described. In contrast to the first embodiment which is directed to a case of recording each data file in division over a plurality of removable recording media, this second embodiment is directed to a case of utilizing a plurality of removable recording media which record the same data file.

Figure 14:
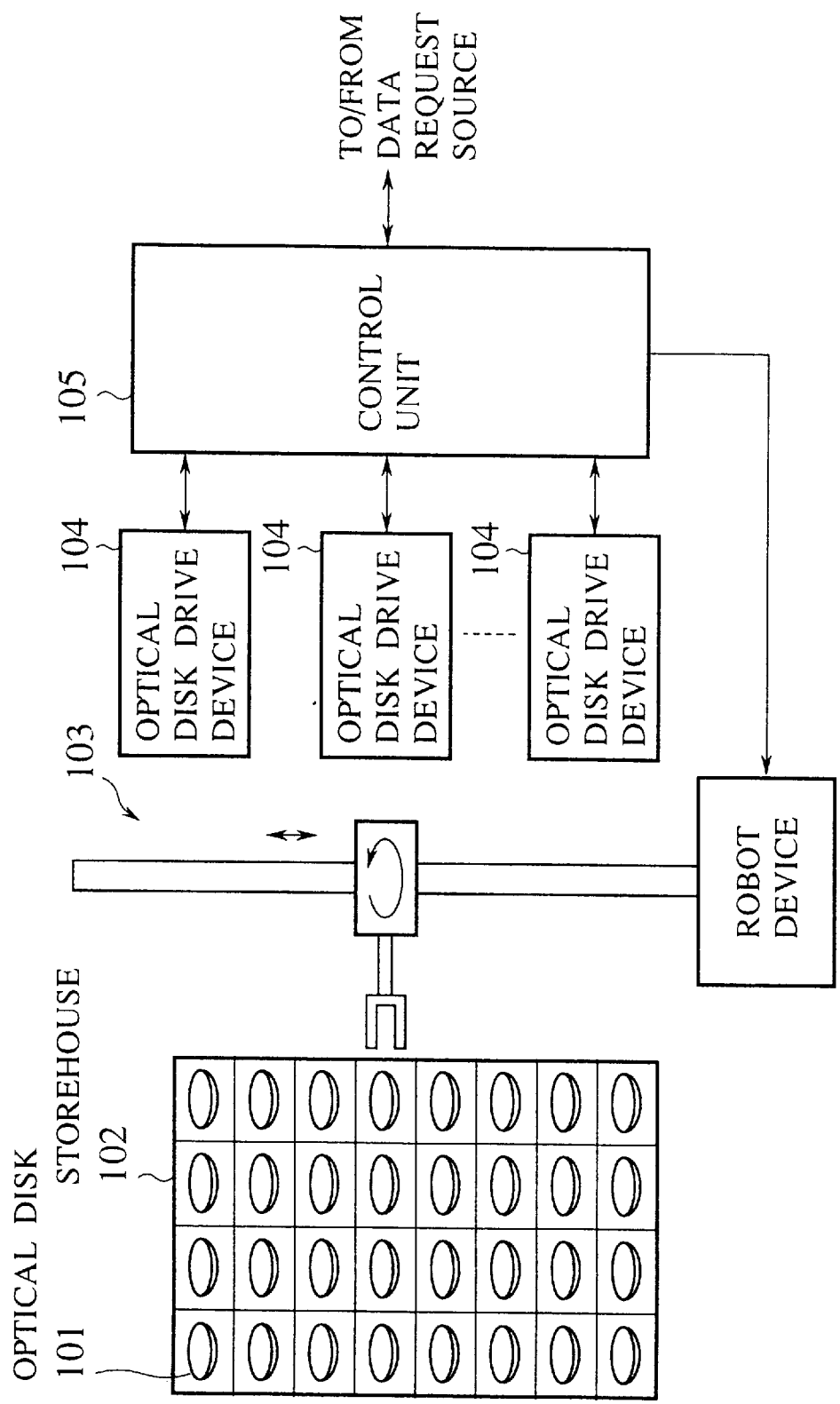
FIG. 14 is a schematic block diagram of the second embodiment of an archiving device according to the present invention.

The archiving device according to this second embodiment has a schematic configuration as shown in FIG. 14, which is basically similar to that of FIG. 1 for the first embodiment described above. Namely, this archiving device of FIG. 14 has a plurality of drive devices 104 where each drive device 104 can read out data from a removable recording medium (which is assumed to be an optical disk) loaded therein.

Here, a loading the optical disk 101 which records the desired data file to be read out into the drive device 104 can be done by a scheme as shown in FIG. 14 in which a necessary optical disk 101 is taken out from a storehouse 102 by a robot device 103 dedicated for loading and unloading of the optical disks, and loading that optical disk 101 into an idle drive device 104. It is also possible to adopt a scheme in which a necessary optical disk 101 is loaded manually by a human operator.

The control unit 105 basically carries out controls of the robot device 103 and the drive devices 104, as well as a transfer of data read out from the optical disk by the drive device 104.

Namely, the control unit 105 manages (or is capable of knowing) information as to which data is recorded in which optical disk, and when a reading request for a data file is received from a data request source such as a data file server, the control unit 105 controls the robot device 103 to load the optical disk 101 which records the requested data file into the drive device 104. At this point, if there are a plurality of optical disks 101 which record the same requested data file, the control unit 105 controls the robot device 103 to load these plurality of optical disks 101 into more than one drive devices 104. Thereafter, the simultaneous reading of different portions of the requested data file is started in parallel at these more than one drive devices 104, and the read out data file is transferred to the data request source.

Here, a number of drive devices 104 to be loaded with the optical disks 101 recording the same data file can be determined in various manners. When there are a sufficient number of optical disks 101 recording the same data file, all the drive devices 104 can be used. When some drive devices 104 are already in use for the reading of the other data file, the remaining drive devices 104 alone may be used, or some drive devices 104 in use for the reading of the other data file may be taken over. At this point, it is also possible to give a priority level to a reading request for a data file so that more drive devices 104 can be allocated to a reading request with a higher priority level and a required time for a reading request with a higher priority level can be shortened.

Figure 15:
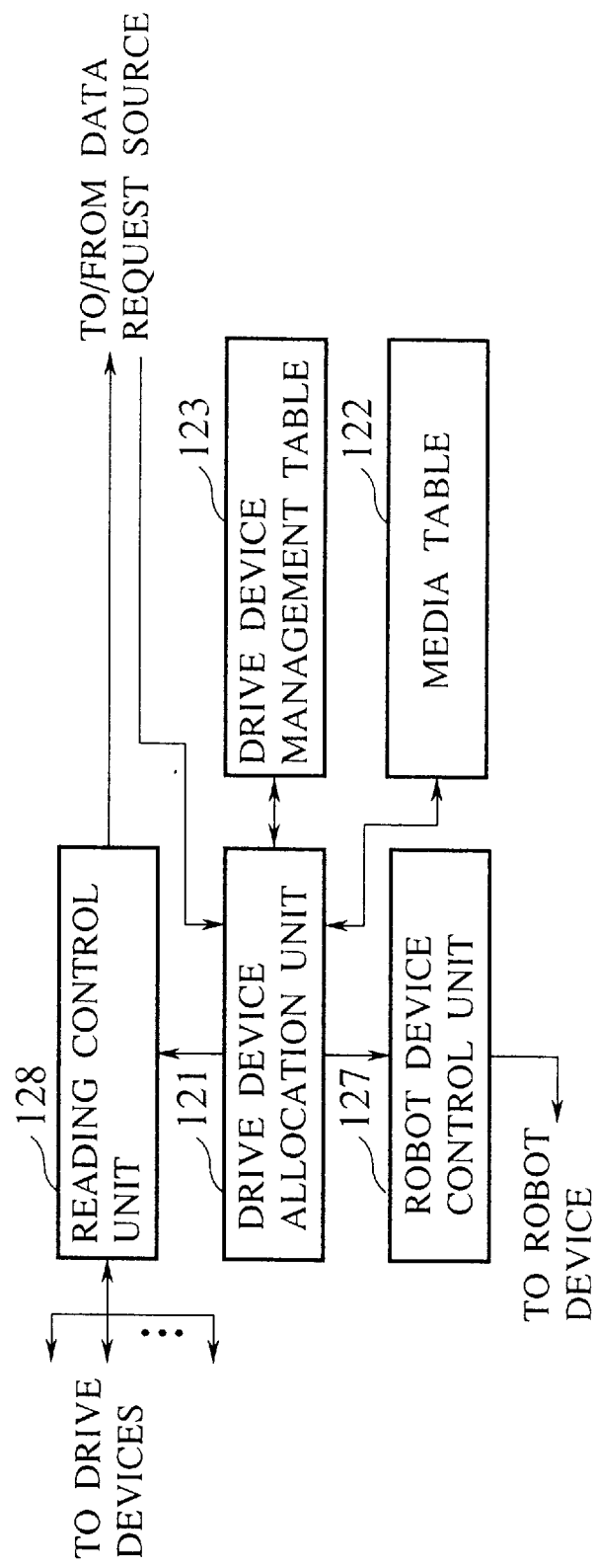
FIG. 15 is a functional block diagram of a control unit in the archiving device of FIG. 14.
Figure 16:
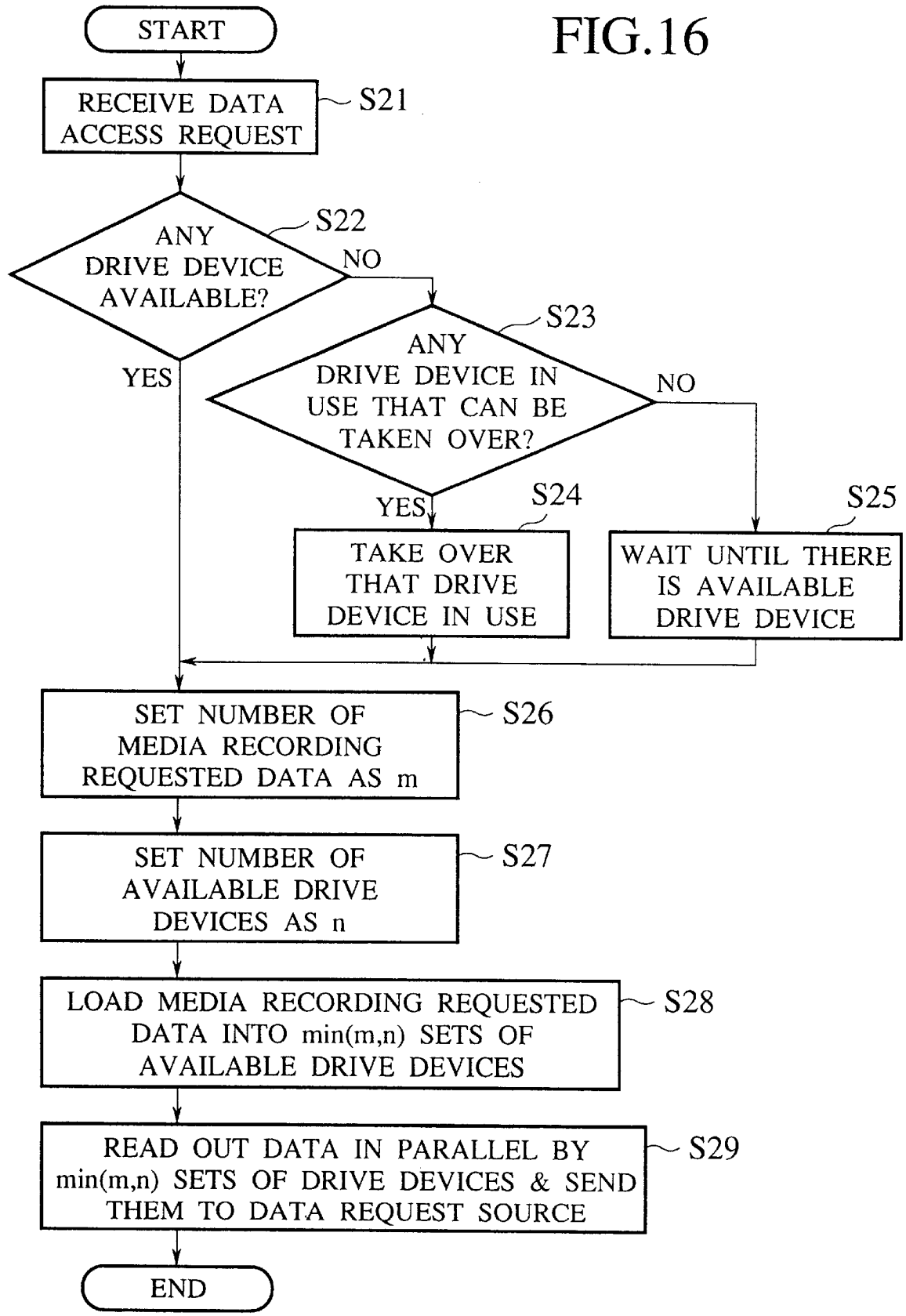
Fig. 16 is a flow chart of a processing procedure for the control unit of FIG. 15.

Now, the configuration and the operation of the control unit 105 in this second embodiment will be described in further detail. FIG. 15 shows an exemplary internal configuration of the control unit 105 in the archiving device of FIG. 14, and FIG. 16 shows a flow chart for the operation of this control unit 105 of FIG. 15.

When a data access request from a data request source is received (step S21), a drive device allocation unit 121 determines which drive devices 104 are to be used for the reading of the requested data, by using information recorded in a drive device management table 123 and a media table 122. The drive device management table 123 records an information as to which drive device 104 is currently in use, and which medium (optical disk 101) is accessed by each drive device 104 which is currently in use, for each drive device 104 provided in the archiving device. The media table 122 records an information as to how many media (optical disks 101) are recording which data, and a location in the storehouse 102 where each medium is stored.

The drive device allocation unit 121 refers to the drive device management table 123 first, to check which drive device 104 is available (step S22). When there is no available drive device 104 which is currently not in use, whether there is any drive device 104 which is currently used for the other data access request and which can be taken over to serve for this data access request or not is checked (step S23). In a case where some data access is carried out by using a plurality of drive devices 104 simultaneously, some of these plurality of drive devices 104 can be taken over.

Here, when a priority level is set up for a data access request, the drive devices 104 currently used for the data access request with a lower priority level are taken over to serve for the data access request with a higher priority level (step S24). When there is no drive device 104 that can be taken over, this data access request is kept awaiting until there is an available drive device 104 (step S25).

Next, by referring to the media table 122, a number of media recording the requested data is checked and set as m (step S26). When there are a plurality of media recording the requested data, it becomes possible to realize a high speed data reading by reading these plurality of media in parallel by a plurality of drive devices 104.

Next, by referring to the drive device management table 123, a number of available drive devices 104 is checked and set as n (step S27).

Then, a robot device control unit 127 issues a command to the robot device 103 to load the media recording the requested data to as many as min(m, n) sets of drive devices 104 (step S28). Thereafter, a reading control unit 128 operates these allocated min(m, n) sets of drive devices 104 in parallel, to read out the requested data in parallel, and transfers the read out data to the data request source (step S29).

In this second embodiment, it is also possible to adopt a scheme in which the loading of the media recording the requested data into the drive devices 104 at the step S28 is to be carried out by an operator. In such a case, the robot device control unit 127 in the configuration of FIG. 15 becomes unnecessary.

As for a number of drive devices 104 to be used for reading of the media and a number of media with the same data to be loaded simultaneously, instead of a scheme for determining these numbers automatically by managing tables as described above, it is also possible to adopt a scheme in which these numbers are to be determined by an operator, or a scheme in which these numbers are to be specified by the data request source.

In addition, as for a location of the media recording the requested data or an information for identifying that location, instead of a scheme for recording such an information in the media table as described above, it is also possible to adopt a scheme which uses an off-line management of such an information, or a scheme in which such an information is to be specified by the data request source.

Now, with references to FIGS. 17, 18, 19A and 19B, the operation in the archiving device of this second embodiment will be described in further detail.

Figure 17:
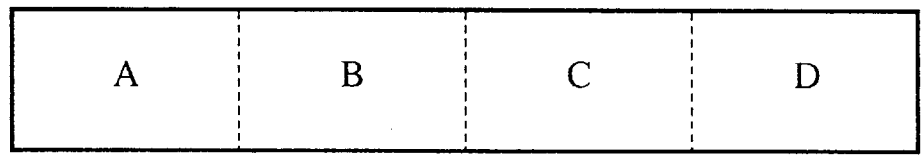
FIG. 17 is a diagram showing an exemplary data file to be recorded in optical disks in the archiving device of FIG. 14.

First, suppose that the data file recorded in the removable recording media has a structure as shown in FIG. 17 in which one data file is divided into four blocks A, B, C and D. This data file can be a single digitized video data, static image data, speech data, or text file.

Figure 18:
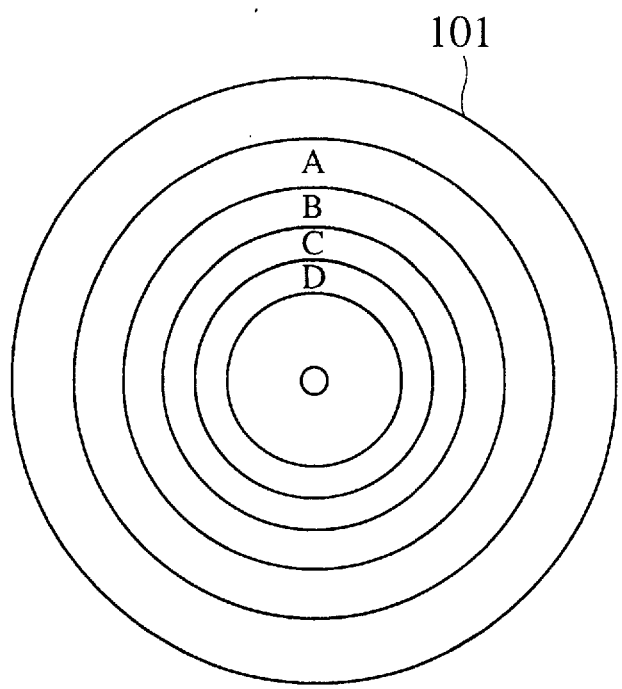
FIG. 18 is a diagram showing an exemplary data contents recorded in an optical disk in the archiving device of FIG. 14.

This data file is recorded on the optical disk 101 in an order of blocks A, B, C and D as shown in FIG. 18.

When this optical disk 101 is read by the conventional archiving device, the operation can be represented as shown in FIG. 19A. Namely, in this case, four blocks A, B, C and D constituting the data file are to be read out sequentially in this order by using one drive device.

In contrast, the operation for reading this data file in the archiving device of this second embodiment can be represented as shown in FIG. 19B. Namely, in the archiving device of this second embodiment, a plurality of optical disks 101 which are recording the same file as shown in FIG. 18 are provided in advance. FIG. 19B shows an exemplary case in which four drive devices 104 are available. From the optical disks 101 with data as shown in FIG. 18 which are loaded into four drive devices #1 to #4. the drive device #1 reads out the block A, the drive device #2 reads out the block B, the drive device #3 reads out the block C, and the drive device #4 reads out the block D, all in parallel.

As a result, as shown in FIG. 19B, the entire data file can be read out in a shorter time than that required in the conventional case shown in FIG. 19A. When a number of drive devices 104 provided in the archiving device is increased, it becomes possible to read out the data file in an even shorter time.

The archiving device of this second embodiment as described above is to be used as an auxiliary memory device of the data file server, etc., for processing a reading request for a data file from a client terminal (a user terminal or computer).

As already described with references to FIG. 2 and FIG. 3, the archiving device can be connected with the data file server, etc., through a dedicated interface or a communication path. It is also possible for a plurality of data file servers, etc., to share the same archiving device through communication paths.

Referring now to FIG. 20 to FIG. 28, various embodiments of a data file server according to the present invention will be described.

Figure 20:
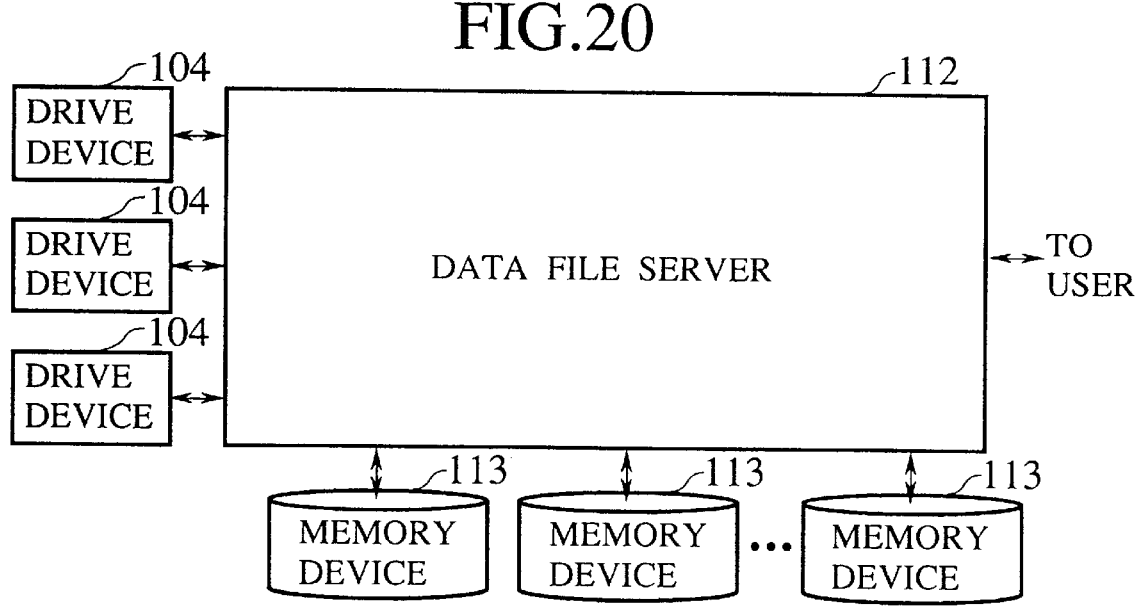
FIG. 20 is a schematic block diagram of one embodiment of a data file server according to the present invention.

FIG. 20 shows one embodiment of a data file server according to the present invention. This data file server 112 of FIG. 20 has a plurality of memory devices 113 for storing date files. For these memory devices 113, magnetic disk devices can be used, for example. The data file server 112 of FIG. 20 is realized by incorporating therein the control unit 105 of the archiving device of FIG. 14, for example.

In this data file server 112, in a case where a reading request for a data file arrives from a user terminal device, etc., through a network, etc., when there is a necessary data file in the memory devices 113, this data file is read out and sent to the user. When the necessary data is not present in the memory devices 113 but recorded in the removable memory media such as optical disks, different portions of the necessary data file are read out simultaneously from a plurality of optical disks recording the same necessary data file by using a plurality of drive devices 104 connected to the data file server 112, similarly as in the archiving device of FIG. 14, and the read out data file is transferred to the memory devices 113.

As a result, it is possible to read out the requested data file in a short time in this data file server, similarly as in the archiving device of FIG. 14. Here, it is also possible to change a number of drive devices 104 to be used simultaneously according to a priority level of the data file request, similarly as in the archiving device of FIG. 14.

Figure 21:
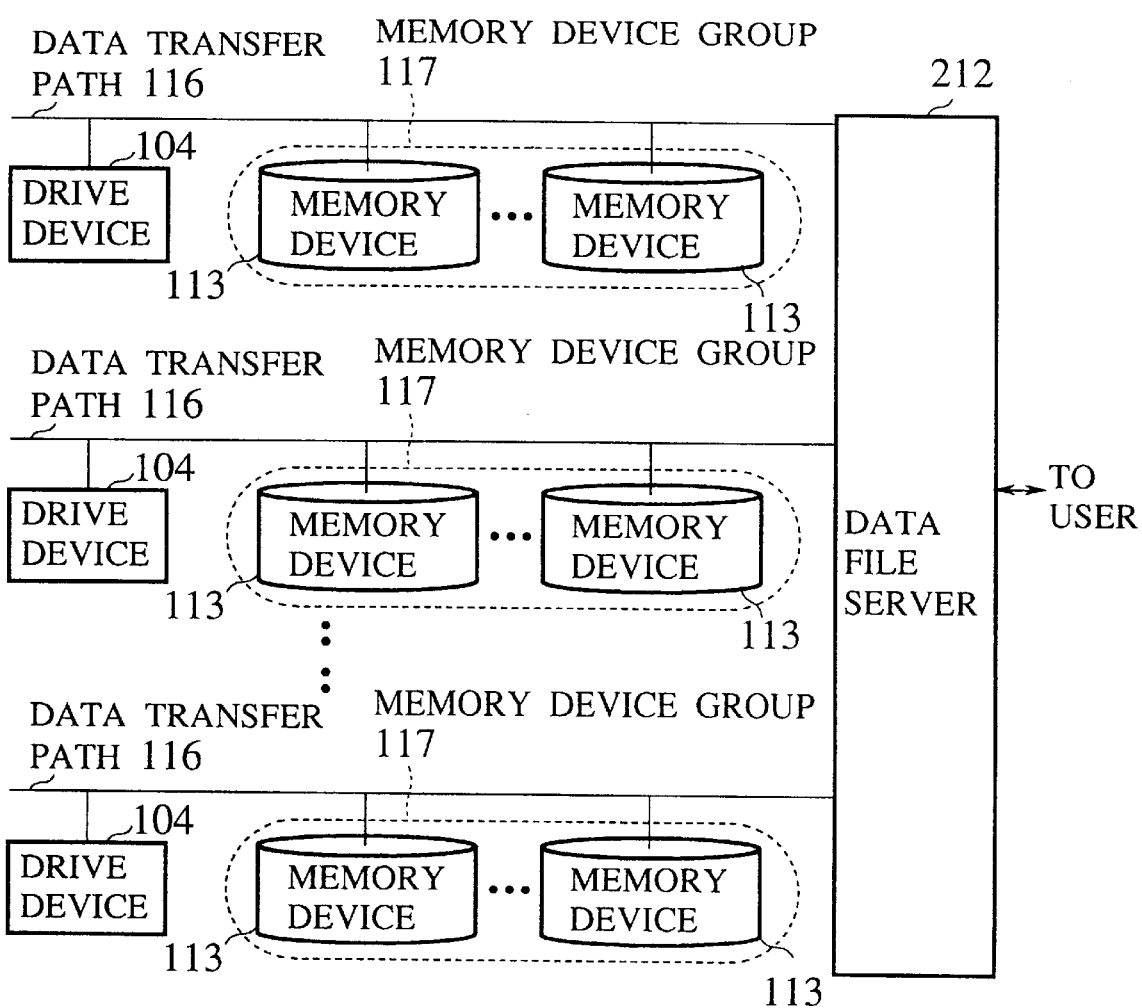
FIG. 21 is a schematic block diagram of another embodiment of a data file server according to the present invention.

Next, FIG. 21 shows another embodiment of a data file server according to the present invention. This data file server 212 of FIG. 21 is realized by incorporating therein the control unit 105 of the archiving device of FIG. 14, for example. In this data file server 212, the memory devices 113 such as magnetic disk devices for storing the data files are divided into a plurality of memory device groups 117, and each memory device group 117 is connected with the data file server 212 through one dedicated data transfer path 116. To each data transfer path 116, a dedicated drive device 104 for reading the data file from the removable recording media is connected.

With this configuration, when it is desired to transfer the data file recorded in some removable recording medium to some memory device 113, this removable recording medium is read by using the drive device 114 which is connected to the same data transfer path 116 as the memory device 113 to which the data file is to be transferred, so that it is possible to realize the transfer of the data file without giving adverse influence such as an increase of load to the other data transfer paths.

In addition, in this data file server 212, when there is a need to transfer the contents of the data file recorded in the removable recording medium to a plurality of memory devices 113, a plurality of removable recording media recording the same data file can be loaded into the drive devices 104, connected to the same data transfer paths 116 as these memory devices 113 to which the data file is to be transferred, and the necessary data file can be read out in parallel by these drive devices 104, so that the data file can be read out and transferred to the memory devices 113 in parallel and the data file transfer can be realized in a short time.

For example, in a case of increasing the reading and transfer rate with respect to the memory devices 113 by adopting the striping scheme which records the data file in division over a plurality of memory devices 113, at a time of writing data into the memory devices 113, different portions of the same data file are to be written into the respective memory devices 113. In this case, by loading a plurality of removable recording media recording the same data file into the drive devices 104 connected with the same data transfer paths 116 as the respective memory devices 113, and reading different portions of the same data files simultaneously, it is possible to realize the data file transfer in a short time.

Now, the operation of this data file server 212 will be described with references to FIG. 22 and FIG. 23. Here, it is assumed that the data file server 212 has four memory device groups #1 to #4 and four data transfer paths #1 to #4 connected with them, respectively, as shown in FIG. 23. It is also assumed that each one of the memory device groups #1 to #4 has two memory devices (#1 and #5, #2 and #6, #3 and #7, #4 and #8, respectively) as shown in FIG. 23. To the data transfer paths #1 to #4, the drive devices #1 to #4 for reading the data files from the removable recording media are connected, respectively.

Figure 22:
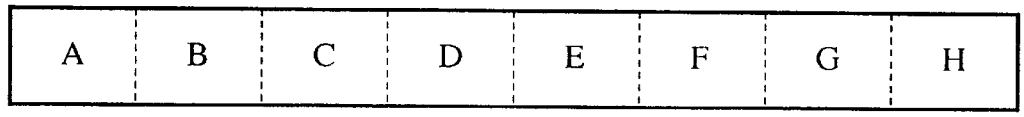
FIG. 22 is a diagram showing an exemplary data file to be transferred from drive devices to memory disks in the data file server of FIG. 21.
Figure 23:
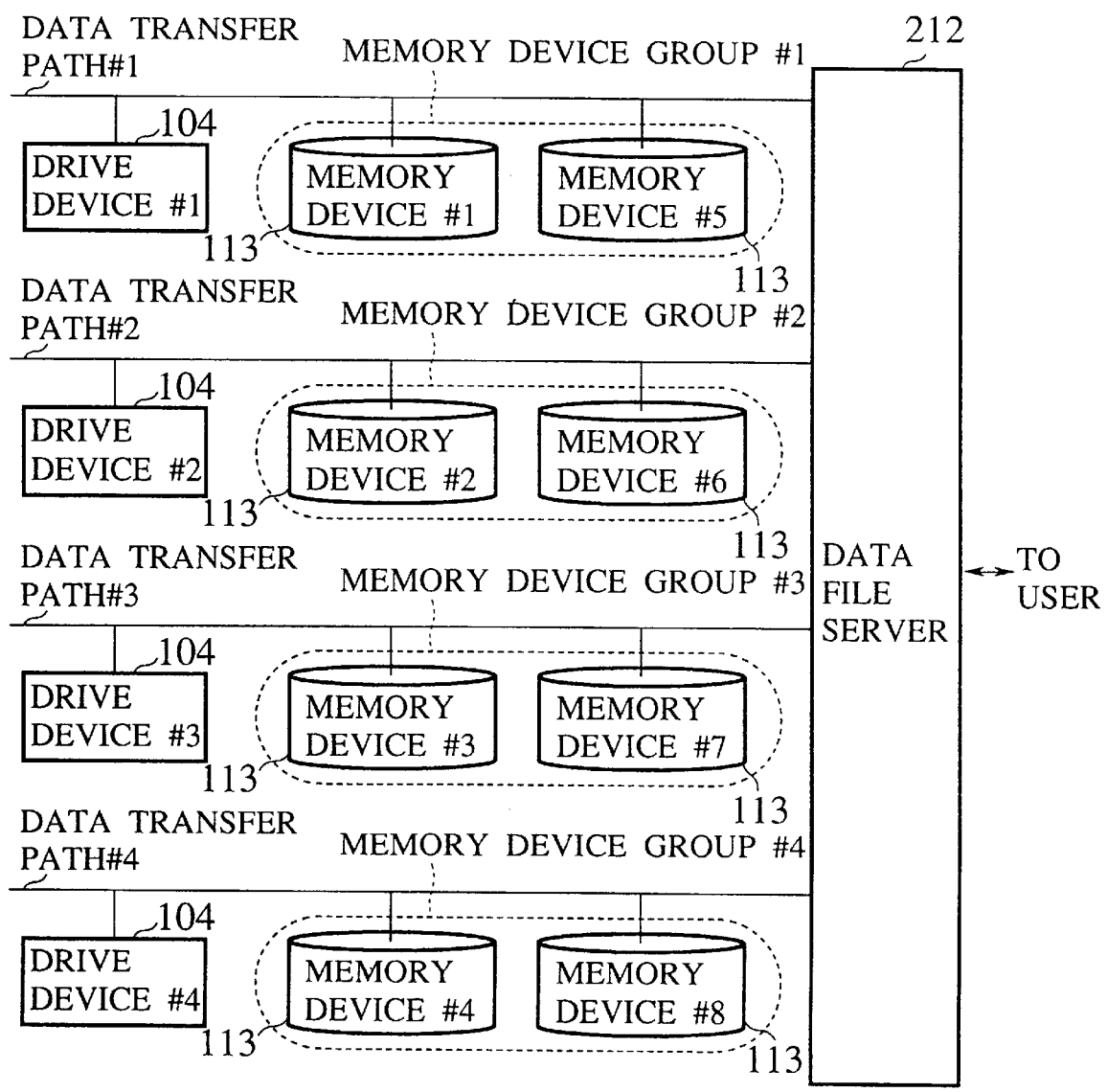
FIG. 23 is a schematic block diagram of the data file server of FIG. 21 for an exemplary specific case of handling the exemplary data file of FIG. 22.

In the data file server 212 with this configuration, the operation in a case of transferring the data file as shown in FIG. 22 from the removable recording media to the memory devices 113 will now be described. Here, it is assumed that the data file to be stored in the memory devices 113 by using the striping is divided into eight blocks A, B, C, D, E, F, G and H as shown in FIG. 22. This data file of FIG. 22 is to be stored by using the striping, by storing blocks A. B, C, D, E, F, G and H into the memory devices #1, #2, #3, #4, #5, #6, #7 and #8, respectively.

To this end, first, four removable recording media recording the same data file of FIG. 22 are provided, and loaded into the drive devices #1 to #4 connected with the data transfer paths #1 to #4, respectively. Then, the drive device #1 reads out the blocks A and E and transfers these blocks A and E to the memory devices #1 and #5, respectively, the drive device #2 reads out the blocks B and F and transfers these blocks B and F to the memory devices #2 and #6, respectively, the drive device #3 reads out the blocks C and G and transfers these blocks C and G to the memory devices #3 and #7, respectively, and the drive device #4 reads out the blocks D and H and transfers these blocks D and H to the memory devices #4 and #8, respectively.

As illustrated in this example, in a case of transferring the data file read out from the removable recording media by the drive devices 104 to the memory devices 113, each drive device 104 and each memory device 113 is connected with a dedicated-independent data transfer path 116, so that only a local data transfer within each data transfer path 116 occurs. For this reason, it is possible to utilize the data transfer paths 116 and the drive devices 104 efficiently, and the data file transfer can be realized in parallel in a short time.

In a case of transferring the data file between the drive device 104 and the memory device 113 which are connected with the same data transfer path 116, it is also possible to adopt a scheme in which the data file is transferred from the drive device 104 to a memory (not shown) provided in the data file server 212 once, and then transferred to the memory device 113 from that memory.

Now, the data file server which stores the data file in division over a plurality of memory devices by using the striping often employs a scheme for storing a parity of data stored in a plurality of memory devices in another memory device so that a stored content can be recovered by using the parity even in a case of a trouble in the memory device. This is a technique which is widely known as RAID (Redundant Arrays of Inexpensive Disks), and the present invention is also applicable to a case of using this RAID technique.

Figure 24:
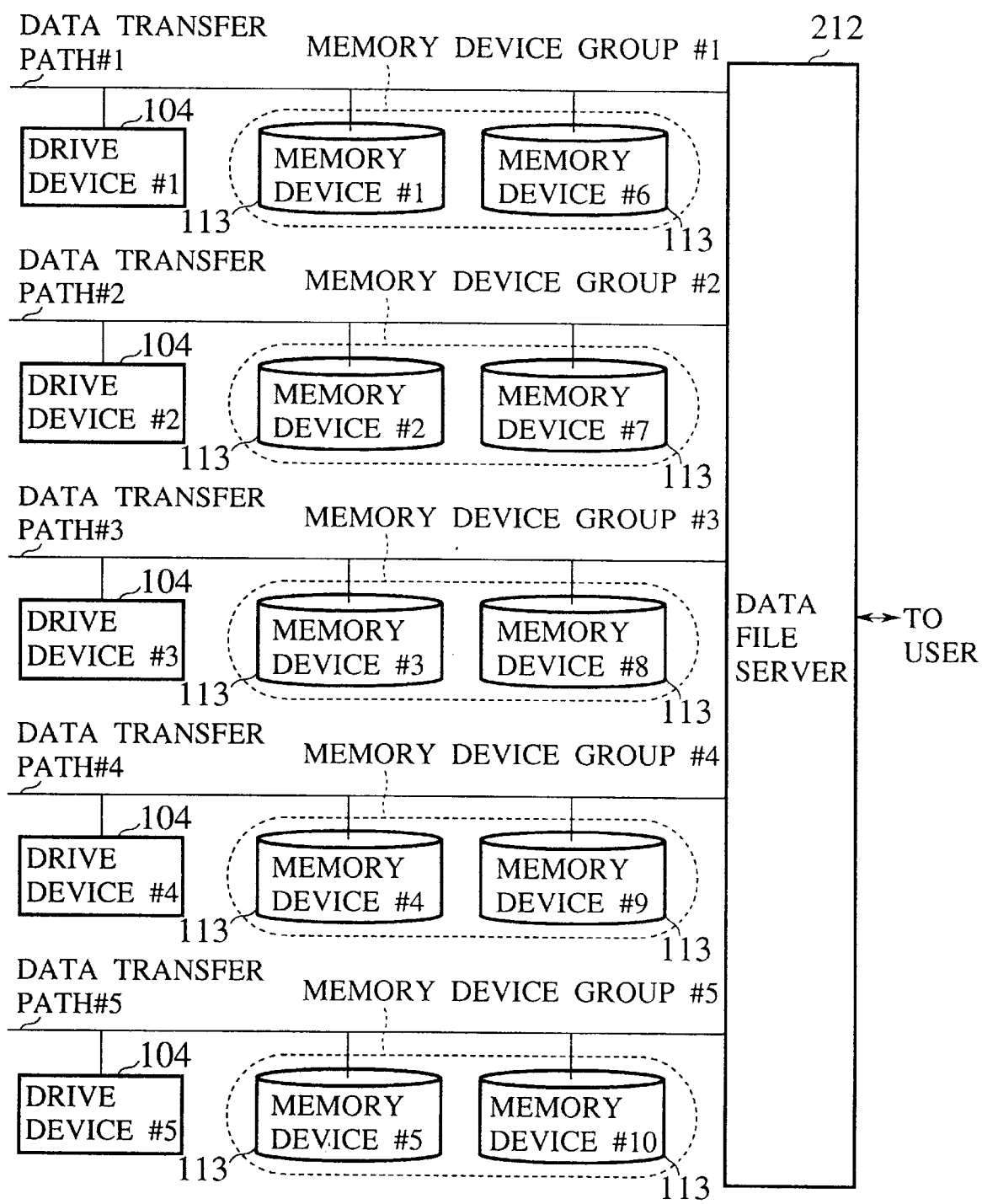
FIG. 24 is a schematic block diagram of another embodiment of a data file server according to the present invention.

FIG. 24 shows one embodiment of a data file server according to the present invention in a case of using the RAID technique.

This data file server 212 of FIG. 24 has five memory device groups #1 to #5 and five data transfer paths #1 to #5 connected with them, respectively. Each one of the memory device groups #1 to #5 has two memory devices (#1 and #6, #2 and #7, #3 and #8, #4 and #9, #5 and #10, respectively) as shown in FIG. 24. To the data transfer paths #1 to #5, the drive devices #1 to #5 for reading the data files from the removable recording media are connected, respectively.

In the data file server 212 with this configuration, the operation in a case of transferring the data file as shown in FIG. 22 from the removable recording media to the memory devices 113 will now be described. Here, it is assumed that the data file to be stored in the memory devices 113 by using the striping is divided into eight blocks A, B, C, D, E, F, G and H as shown in FIG. 22. This data file of FIG. 22 is to be stored by using the striping, by storing blocks A, B, C, D, E, F, G and H into the memory devices #1, #2, #3, #4, #6, #7, #8 and #9, respectively. In addition, a parity (an exclusive OR) of the blocks A, B, C and D is to be stored in the memory device #5, while a parity of the blocks E, F, G and H is to be stored in the memory device #10.

To this end, first, five removable recording media recording the same data file of FIG. 22 are provided, and loaded into the drive devices #1 to #5 connected with the data transfer paths #1 to #5, respectively. Then, the drive device #1 reads out the blocks A and E and transfers these blocks A and E to the memory devices #1 and #6, respectively, the drive device #2 reads out the blocks B and F and transfers these blocks B and F to the memory devices #2 and #7, respectively, the drive device #3 reads out the blocks C and G and transfers these blocks C and G to the memory devices #3 and #8, respectively, and the drive device #4 reads out the blocks D and H and transfers these blocks D and H to the memory devices #4 and #9, respectively. The drive device #5 reads out the blocks A to H and transfers a parity of the blocks A, B, C and D and a parity of the blocks E, F, G and H to the memory devices #5 and #10, respectively.

In this example, it is necessary for the drive device #5 to read out all the data file contents in order to calculate parities. For this reason, at a time of data file transfer, the drive device #5 requires a longer time than the drive devices #1 to #4. This problem can be resolved by either one of the following two schemes.

The first scheme is a scheme for distributing a plurality of memory devices for storing the parities over a plurality of memory device groups, instead of fixedly using one memory device group (the memory device group #5 in the above example). This is the scheme which is widely known as RAID5. For example, in an example of FIG. 24, the blocks A, B, C, D, E, F, G and H can be stored in the memory devices #1, #2, #3, #4, #6, #7, #8 and #10, respectively, while the parity of the blocks A, B, C and D and the parity of the blocks E, F, G and H can be stored in the memory devices #5 and #9, respectively. In this manner, the parities are distributed to the memory device group #4 and the memory device group #5, so that an amount of data which is required to be read out in order to calculate the parity can be reduced.

In this example, the parities are distributed over two memory device groups, but in practice, it is possible to distribute the parities uniformly over all the memory device groups by dividing the data file into a greater number of blocks.

The second scheme is a scheme for collecting data necessary in calculating the parities within the data file server 212. For example, suppose that the parity of the blocks A, B, C and D of the data file is to be stored in the memory device #5. In this case, the block A which is read out by the drive device #1 and transferred to the memory device #1, also stored inside the data file server 212. Similarly, the blocks B, C and D which are read out by the drive devices #2, #3 and #4 and transferred to the memory devices #2, #3 and #4, respectively, are also stored inside the data file server 212. Then, the parity of the blocks A, B, C and D stored inside the data file server 212 is calculated and transferred to the memory device #5. In this scheme, there is no need to read out the data solely for the purpose of parity generation, so that apart from a time required for parity calculation itself, the data file transfer can be realized in a similar time as required in a case of simple striping without using the parity as shown in FIG. 23. The parity generation can be realized by means of software inside the data file server 212, or at higher speed by means of a dedicated hardware provided inside the data file server 212.

Next, FIG. 25 shows another embodiment of a data file server according to the present invention. This data file server of FIG. 25 is a modification of the data file server of FIG. 21 in which a plurality of drive devices 104 are connected to each data transfer path 116. With this configuration, a plurality of removable recording media recording the same data file can be loaded into a plurality of drive devices 104 connected to the same data transfer path 116 and read in parallel, so that the data file reading in an even shorter time than a case of using one drive device 104 can be realized.

Next, FIG. 26 shows another embodiment of a data file server according to the present invention. This data file server is a modification of the data file server of FIG. 21 in which an archiving device 120 is connected to each data transfer path 116 instead of the drive device 104. This archiving device 120 can be either a conventional one, or the archiving device according to the present invention such as that shown in FIG. 14. In this configuration, the data file server utilizes the archiving device 120 as a device for reading the removable recording media, and the operation and the effect are basically the same as those of the data file server of FIG. 21.

As described, according to the archiving device of the present invention, data can be read out simultaneously from a plurality of removable recording media provided that a plurality of drive devices are available, so that a time required in reading out a requested data file can be reduced.

Also, according to the data file server of the present invention, data can be read out simultaneously from a plurality of removable recording media provided that a plurality of drive devices are available, so that it becomes possible to transfer the data file recorded in the removable recording media to the memory device at high speed. As a result, it becomes possible to reduce a time required since a user's request is made until the data file delivery is started.

Also, by controlling a number of drive devices to read out a data file according to the priority level set to a reading request for the data file, it becomes possible to read out the data file in an even shorter time by allocating many drive devices to the reading request with a high priority level.

Also, according to the present invention, it is possible to reduce a time required in reading out a requested data file from removable recording media and transferring it to a plurality of memory devices for storing data file by using a striping technique.

Also, according to the data file server according to the present invention, in a case of storing the data file in a plurality of memory devices by using a striping technique, the data file can be read out in parallel by the drive devices for the removable recording media which are connected with data transfer paths independently provided with respect to the memory device groups, so that a time required for reading the entire data file can be reduced because the data transfer path is not going to be a bottleneck.

Also, according to the present invention, when the removable recording medium recording data of the requested data file is disabled, it is possible to recover that data by using the parity and there is no need to store the spare removable recording media recording the same data file, so that a recording cost and a space required for storing removable recording media can be saved.

Also, according to the data file server of the present invention, even when the memory device to which data read out from the removable recording medium is to be transferred is in trouble, after the troubled memory device is replaced, data, to be stored in that memory device can be easily recovered by reading out that data from the removable recording medium.

It is to be noted that, in the various embodiments described above, the archiving device and the data file server using the drive devices for the optical disks as the removable recording media have been described, but the present invention is equally applicable to cases in which the optical disks are replaced by magnetic tapes, magneto-optical disks, phase change type optical disks, CD-ROMs, CD-R, flash memory cards, etc.

It should be noted that the effects of the present invention as described above can also be achieved by using non-removable memory devices such as usual magnetic disk devices instead of the drive devices and storing the same data file in a plurality of these non-removable memory devices.

It is also to be noted that the magnetic disk devices in which the recording media are removable, i.e., freely attached to or detached from drive devices, are presently in a process of development, and the archiving device according to the present invention can also be realized by using such magnetic disk devices using removable recording media, instead of the removable recording media and the drive devices used in the various embodiments described above.

It is also to be noted that the control unit and the data file server in the various embodiments described above can be realized by means of hardware, or by means of software on general purpose computer.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An archiving device, comprising:
    a plurality of drive devices for reading out a plurality of data constituting one data file from a plurality of removable recording media in parallel;
    a recording media loading/unloading device for selectively loading/unloading the removable recording media to/from said plurality of drive devices; and
    control means for controlling media loading/unloading operations by the recording media loading/unloading device and data reading operations by the drive devices according to a reading request for a desired data file to selectively use said plurality of drive devices in reading the desired data file from said plurality of removable recording media.

2. The archiving device of claim 1, wherein each removable recording medium records data obtained by dividing said one data file.

3. The archiving device of claim 2, wherein said plurality of removable recording media record said one data file by using a striping technique.

4. The archiving device of claim 1, wherein each removable recording medium mixedly records a plurality of data belonging to different data files, each data being a part of a corresponding data file obtained by dividing the corresponding data file into parts.

5. The archiving device of claim 4, wherein said plurality of removable recording media record said plurality of data files such that top data of different data files are recorded in different removable recording media.

6. The archiving device of claim 1, wherein said plurality of removable recording media record identical data constituting said one data file.

7. The archiving device of claim 1, wherein the control means changes a number of drive devices allocated to a reading of each data file according to a priority level set to a reading request for each data file.

8. The archiving device of claim 1, wherein said plurality of removable recording media include more than one data recording removable recording media which record the data constituting said one data file, and at least one parity recording removable recording medium which records a parity among the data recorded in the data recording removable recording media, and the archiving device further comprises:
    data recovery means for recovering data recorded in one of the data recording removable recording media which is disabled, by using data recorded in remaining ones of the data recording removable recording media and the parity recorded in the parity recording removable recording medium.

9. The archiving device of claim 8, wherein said plurality of drive devices read out data recorded in remaining ones of the data recording removable recording media and the parity recorded in the parity recording removable recording medium in parallel.

10. The archiving device of claim 8, wherein the control means increases a number of drive devices allocated to a reading of said one data file when one of the data recording removable recording media is disabled.

11. The archiving device of claim 10, wherein the control means increases a number of drive devices by raising a priority level set for a reading request for said one data file.

12. The archiving device of claim 8, further comprising:
    means for writing data recovered by the data recovery means into a new removable recording medium.

13. A data file server, comprising:
    a plurality of memory devices for storing data files;
    transfer means for reading out a desired data file from the memory devices and transferring the read out desired data file to a request source according to a reading request for the desired data file given from the request source;
    a plurality of drive devices capable of reading out a plurality of data constituting one data file from a plurality of removable recording media in parallel;
    a recording media loading/unloading device for selectively loading/unloading the removable recording media to/from said plurality of drive devices;
    control means for controlling media loading/unloading operations by the recording media loading/unloading device and data reading operations by the drive devices according to a reading request for a desired data file to selectively use said plurality of drive devices in reading the desired data file from said plurality of removable recording media; and
    writing means for writing more than one data read out by more than one of the drive devices in parallel, into the memory devices.

14. The data file server of claim 13, wherein said plurality of memory devices store said one data file in division over said plurality of memory devices, and said plurality of removable recording media record said one data file in division over said plurality of removable recording media in an identical order as said plurality of memory devices.

15. The data file server of claim 13, wherein said plurality of memory devices store said one data file in division over said plurality of memory devices in a first order, and said plurality of removable recording media record said one data file in division over said plurality of removable recording media in a second order different from the first order.

16. The data file server of claim 13, wherein at least one of the memory devices is connected with at least one corresponding drive device through an independent data transfer path.

17. The data file server of claim 16, wherein when a plurality of data constituting one data file are to be transferred from the removable recording media to the memory devices, said at least one drive device reads out a necessary portion of said one data file for corresponding memory device from one removable recording medium, and the writing means writes the necessary portion read out by said at least one drive device into corresponding memory device through the independent data transfer path.

18. The data file server of claim 16, wherein when data for one memory device is to be transferred from one removable recording medium to said one memory device, said at least one drive device connected with said one memory device reads out said data from said one removable recording medium, and the writing means writes said data read out by said at least one drive device into said one memory device through the independent data transfer path.

19. The data file server of claim 13, wherein said plurality of memory devices store said one data file in division over said plurality of memory devices, and when data stored in one of the memory devices is to be recovered, one of the drive devices reads out a necessary portion of said one data file from one removable recording medium, and the writing means writes the necessary portion read out by said one of the drive devices into said one of the memory devices.

* * * * *